United States Patent
Bailey et al.

(10) Patent No.: US 7,228,524 B2
(45) Date of Patent: Jun. 5, 2007

(54) METHOD AND SYSTEM FOR ANALYSIS OF SOFTWARE REQUIREMENTS

(75) Inventors: Bruce Lindley-Burr Bailey, Wallingford, PA (US); Tomas Jan Stenstrom, Fort Washington, PA (US); William E. Coughenour, Jr., Wilmington, DE (US)

(73) Assignee: The Boeing Company, Chicago, IL (US)

( * ) Notice: Subject to any disclaimer, the term of this patent is extended or adjusted under 35 U.S.C. 154(b) by 587 days.

(21) Appl. No.: 10/326,221

(22) Filed: Dec. 20, 2002

(65) Prior Publication Data

US 2004/0123272 A1 Jun. 24, 2004

(51) Int. Cl.
*G06F 9/44* (2006.01)
*G06F 11/00* (2006.01)

(52) U.S. Cl. .................. 717/100; 717/124; 714/38
(58) Field of Classification Search .............. 717/100, 717/101, 120
See application file for complete search history.

(56) References Cited

U.S. PATENT DOCUMENTS

| | | | |
|---|---|---|---|
| 4,799,141 A | | 1/1989 | Drusinsky et al. |
| 6,038,378 A | * | 3/2000 | Kita et al. .................. 714/38 |
| 2002/0100015 A1 | | 7/2002 | Harel et al. |

OTHER PUBLICATIONS

Heitmeyer et al., "Automated Consistency Checking of Requirements Specifications", Jul. 1996 ACM Transaction on Software Engineering and Methodology, pp. 231-261.*

Heitmeyer et al., "Tools for Formal Specification, Verification, and Validation of Requirements", COMPASS 1997, pp. 1-13*

"Doing Requirements Right the First Time", Theodore F. Hammer et al., pp. 20-25, CROSSTALK The Jouranl of Defense Software, Dec. 1998, http://www.stsc.hill.af.mil/crosstalk/1998/12/hammer.pdf.*

Heimdahl Mats et al., "Completeness and consistency Analysis of State-Based Requirements", 1995, ACM Press, International Conference on Software Engineering, Proceedings of the 17th international conference on Software engineering, pp. 3-14.*

I-Logix; "Statemate MAGNUM"; downloaded from http://www.ilogix.com/products/magnum/index.cfm on Oct. 30, 2002.

Kennedy Carter; "iUML—The Executable UML Modelling Environment"; downloaded from http://www.kc.com/products/iuml/ on Oct. 30, 2002.

* cited by examiner

*Primary Examiner*—Mary Steelman
*Assistant Examiner*—Chih-Ching Chow
(74) *Attorney, Agent, or Firm*—Harness, Dickey & Pierce, P.L.C.

(57) ABSTRACT

To help identify shortcomings in software requirements for a software capability early in the software development life cycle, the present invention discloses a method of logic testing a software requirement for a software capability, the method comprising: (a) defining a logical representation of the software requirement; (b) defining a test scenario that corresponds to the software requirement; and (c) processing the defined logical representation with the defined test scenario to thereby generate a simulation result indicative of whether the software requirement needs alteration. Preferably, the present invention is implemented as an integrated tool executed by a desktop PC or workstation that interacts with the user through a variety of graphical user interfaces (GUIs) to perform logic testing of software requirements.

39 Claims, 19 Drawing Sheets

| Output Variables | Values |
|---|---|
| Valve_A_Setting | Closed/Open |
| Valve_B_Setting | Closed/Open |
| Valve_C_Setting | Closed/Open |
| Fuel_Quantity_A | 0.0 - 15.0 gallons |
| Fuel_Quantity_B | 0.0 - 15.0 gallons |
| Fuel_Quantity_C | 0.0 - 15.0 gallons |
| Fuel_Quantity_Total | 0.0 - 45.0 gallons |
| Fuel_Depletion_Rate_A | 0.0 - 30.0 gallons/hour |
| Fuel_Depletion_Rate_B | 0.0 - 30.0 gallons/hour |
| Fuel_Depletion_Rate_C | 0.0 - 30.0 gallons/hour |
| Fuel_Depletion_Rate_Total | 0.0 - 50.0 gallons/hour |

Figure 3

Requirement 1:
The Fuel Tank Manager Capability shall calculate and provide to the crew the fuel quantity and fuel quantity depletion rate for each tank at a minimum rate of once per minute.

(a) Total fuel quantity is determined by summation of fuel quantities that are received from the sensors as Fuel_Quantity_A, Fuel_Quantity_B, and Fuel_Quantity_C.

(b) Depletion rate for a given tank is determined by:
$DR = (Fuel\ Quantity_{N-1} - Fuel\ Quantity_N)*60$ (c) Total depletion rate is determined by:
$DR\_Total = \Sigma_{A,B,C} DR$

Requirement 2:
The Fuel Tank Manager Capability shall calculate the fuel quantity difference between Tanks A and B at a minimum rate of once per minute.

(a)    Diff_$F_A$ = Fuel_Quantity_A – Fuel_Quantity_B

Requirement 3:
The Fuel Tank Manager Capability shall maintain fuel quantity parity between Tank A and Tank B within 0.25 gallons, based on the difference in fuel quantity between Tank A and Tank B.

(a)    Fuel quantity parity is maintained by commanding the valves for Tank A and Tank B open or closed as defined in the following table:

| Diff_$F_A$ | Valve_A_Setting | Valve_B_Setting |
|---|---|---|
| < \|0.25\| | Open | Open |
| ≥ 0.25 | Closed | Open |
| < -0.25 | Open | Closed |

Requirement 4:
When the fuel in Tanks A and B are exhausted, the Fuel Tank Manager Capability shall provide fuel from backup Tank C.

(a)    Tanks A and B are exhausted when either (i) Fuel_Quantity_A, (ii) Fuel Quantity_B, or (iii) both are less than 0.25 gallons (b)    Fuel is provided from Tank C by setting Valve_C_Setting to Open.

Requirement 5:
At system startup, the Fuel Tank Manager Capability shall command fuel flow from Tanks A and B.

Requirement 6:
When a fuel flow command is received from the crew, the Fuel Tank Manager Capability shall command the appropriate valve setting.

Requirement 7:
At system shutdown, the Fuel Tank Manager Capability shall command fuel flow stopped from all three tanks.

(a)    Fuel flow is commanded by setting Valve_A_Setting, Valve_B_Setting, and/or Valve_C_Setting to Open or Closed as appropriate (b)    Fuel flow commands are received from the crew in Crew_Cmd_A, Crew_Cmd_B, or Crew_Cmd_C

Figure 8

| Name | Type | Data Type |
|---|---|---|
| Crew_Cmd_A | In | Setting_type |
| Crew_Cmd_A_Recvd | Loc | Boolean |
| Crew_Cmd_B | In | Setting_type |
| Crew_Cmd_B_Recvd | Loc | Boolean |
| Crew_Cmd_C | In | Setting_type |
| Crew_Cmd_C_Recvd | Loc | Boolean |
| Diff_FA | Loc | Float |
| Fuel_Depletion_Rate_A | Out | Float |
| Fuel_Depletion_Rate_B | Out | Float |
| Fuel_Depletion_Rate_C | Out | Float |
| Fuel_Depletion_Rate_Total | Out | Float |
| Fuel_Quantity_A | In/Out | Float |
| Fuel_Quantity_B | In/Out | Float |
| Fuel_Quantity_C | In/Out | Float |
| Fuel_Quantity_Total | Out | Float |
| One_Minute_Trigger | Loc | Boolean |
| Previous_Fuel_Quant_A | Loc | Float |
| Previous_Fuel_Quant_B | Loc | Float |
| Previous_Fuel_Quant_C | Loc | Float |
| Previous_Fuel_Quant_Total | Loc | Float |
| Shutdown | In | Boolean |
| Startup | Loc | Boolean |
| Valve_A_Setting | Out | Setting_type |
| Valve_B_Setting | Out | Setting_type |
| Valve_C_Setting | Out | Setting_type |

```
Reqt_1  if One_Minute_Trigger then

Fuel_Quantity_Total := Fuel_Quantity_A + Fuel_Quantity_B + Fuel_Quantity_C

Fuel_Depletion_Rate_A := (Previous_Fuel_Quant_A - Fuel_Quantity_A) * 60
        Fuel_Depletion_Rate_B := (Previous_Fuel_Quant_B - Fuel_Quantity_B) * 60
        Fuel_Depletion_Rate_C := (Previous_Fuel_Quant_C - Fuel_Quantity_C) * 60

Fuel_Depletion_Rate_Total := Fuel_Depletion_Rate_A + Fuel_Depletion_Rate_B + Fuel_Depletion_Rate_C Previous_Fuel_Quant_A := Fuel_Quantity_A
        Previous_Fuel_Quant_B := Fuel_Quantity_B
        Previous_Fuel_Quant_C := Fuel_Quantity_C end if
```

Figure 14(a)

METHOD AND SYSTEM FOR ANALYSIS OF SOFTWARE REQUIREMENTS

STATEMENT REGARDING FEDERALLY SPONSORED RESEARCH OR DEVELOPMENT

This invention was developed in the course of work under U.S. government contract DAAH23-00-C-A001. The U.S. government may possess certain rights in the invention.

FIELD OF THE INVENTION

The present invention pertains to software development. More specifically, the present invention relates to a tool for analyzing software requirements early in the software development cycle.

BACKGROUND OF THE INVENTION

Large software development projects typically fall into a "classic" development life cycle. Such a "classic" life cycle is described in United States Defense Department document DOD-STD-2167A Defense Systems Software Development, the disclosure of which is incorporated herein by reference. The phases of this conventional development life cycle fall in chronological order, but may be repeated as new performance capabilities are added to the overall software system or as revisions are made to the system. The life cycle phases are as follows:

(1) Systems Analysis: during which the performance goals for a large system consisting of both software and hardware are specified. At this stage, the major components of the system, often called "configuration items" are identified.

(2) Software Requirements Analysis: during which the system capabilities that are to be implemented by software are isolated. Further, each capability is broken down into a plurality of software requirements. Further still, any interfaces with external devices and interfaces between major software configuration items are defined.

(3) Software Preliminary Design: during which high level software components are identified, wherein each component answers a subset of the requirements. Requirement groupings met by software components do not necessarily correspond to requirement groupings that are part of the software capabilities. Further, high level flow of control (called execution control) for the software components is established. In classic software development, execution control has not been specified in the software requirements. However, it would be beneficial for a system engineer to obtain an initial draft of execution control as necessitated by the software requirements independent of software design factors outside the requirement's immediate domain (such as available operating system services, system architectural constraints, and the like) thereby allowing system engineers who are not computer scientists to analyze the software requirements in isolation. Lastly, during the software preliminary design phase, the interfaces between high level software components are defined.

(4) Software Detailed Design: during which high level software components are broken down into program units, which are in turn broken down into subprogram units. The algorithms for the program units are defined in pseudo-code or program design language (PDL), and the interfaces between program units and subprogram units are defined.

(5) Code and Unit Test: during which, at the subprogram unit level, algorithms are committed to executable code and compiled. The compiled programs are then tested in isolation, which requires building processing environments for each unit to simulate the system in which it executes (referred to as test harnesses). Test harnesses will often comprise more lines of code than the unit being tested. Also, as they are tested, the units are progressively joined into components.

(6) Software Component Test: during which processing environments are built around the components that are progressively created from units. After the processing environment is built, the components are tested. The testing often moves from a desktop simulation environment to a systems laboratory where portions of the actual system hardware may be present.

(7) Requirements Test: during which the high level software components that have been constructed are tested with respect to their requirements. This phase is generally conducted in a systems laboratory where the overall system is simulated (or some of the system is simulated in conjunction with actual hardware components).

(8) System Test: during which the fully realized system is tested against its performance requirements.

As the development of a software system proceeds through these phases, it is often the case that errors introduced at an early phase are not detected until a subsequent phase. It is widely-recognized that such software errors are a chronic and costly problem because the cost of correcting software errors multiplies during subsequent development phases. This is a particular problem with software requirements that are created and tested during phase 2. Conventionally, software requirement quality checks are achieved through a "balancing" of interface models to obtain interface/data element integrity and through peer review of the text of software requirements as well as peer review of other modeling artifacts. However, the inventors' experience has shown that logical errors in software requirements can easily escape these processes. As such, these errors go undetected until subsequent (and costly) phases have completed, thereby requiring designers to essentially "go back to the drawing board".

Therefore, a need in the art exists for an integrated tool that provides users with the ability, at an early phase of the development life cycle, to successfully evaluate whether a software requirement (or a set of software requirements) for a software capability are properly defined. Furthermore, such a tool should preferably perform such an evaluation during the Software Requirements Analysis phase. Further still, such a tool should exhibit a high degree of user-friendliness to not only increase the efficiency of persons using the tool but to also make the tool available to wider range of people with a wider range of skillsets.

SUMMARY OF THE INVENTION

Toward this end, the inventors herein have developed a systematic process and automated tool that provides testing of software requirements to flush out logical errors. The testing is performed through execution of test scenarios against software requirements expressed in their logical formats.

According to one aspect of the present invention, disclosed herein is a method of logic testing a software requirement for a software capability, the method comprising: (1) defining a logical representation of the software requirement; (2) defining a test scenario that corresponds to the software requirement; and (3) processing the defined logical representation with the defined test scenario to thereby generate a simulation result indicative of whether the software requirement needs alteration.

The method may further comprise defining a plurality of variables pertinent to the software requirement, and wherein the logical representation defining step comprises defining the logical representation using the defined variables.

Also, multiple software requirements may be defined and tested through this method. Further, related software requirements may be grouped into testable groups, wherein logic testing with test scenarios is performed on the groups. This feature of the present invention provides a means of efficiently handling systems with a large number of software requirements wherein many of the software requirements are hierarchically related and wherein hundreds or thousands of variables are involved.

Moreover, the present invention preferably interacts with users via a variety of graphical user interfaces (GUIs). Preferable GUIs allow users to perform tasks such as (1) defining variables, (2) defining software requirements, (3) defining test scenarios, (4) selecting which test scenarios are to be used with which software requirements, (5) managing groups of related software requirements, and (6) obtaining feedback on the simulations to determine whether a software requirement or group of related software requirements functioned as expected. GUIs serve as an intuitive tool for user-friendly control of the present invention's operation.

Further, the present invention may be used to create a database that is populated with (1) a multitude of variables pertinent to the software project, (2) a multitude of software requirements and or groups of software requirements defined in logical form using the stored variables, and (3) a multitude of test scenarios. This database can be accessed by the present invention to evaluate the software requirements and groups using different user-selected stored test scenarios. As such, also disclosed herein is a system for logic testing a plurality of software requirements for a software capability, the system comprising: (a) memory in which (1) a plurality of logical representations of the software requirements are stored, and (2) a plurality of test scenarios corresponding to the software requirements are stored; and (b) a processor configured to execute a program, the program configured to (1) obtain user input corresponding to a selection of a software requirement to be tested, (2) obtain user input corresponding to a selection of a stored test scenario for use in testing the selected software requirement, (3) simulate operation of the selected software requirement by testing the stored logical representation of the selected software requirement with the selected test scenario, and (4) provide output to the user indicative of whether the software requirement simulation operated as expected.

The processor of the present invention is preferably a desktop PC or workstation. However, it should be readily understood that the processor may be any computer capable of executing programs and interacting with a user, such as a PDA and the like. The memory and processor may be part of a desktop PC or workstation, or the memory may be a separate database accessed by the processor over a network. As would be readily understood by those of ordinary skill in the art, any known memory device capable of storing data electronically and interacting with a programmed processor may be used in the practice of the present invention.

Further, the present invention may be embodied on a computer-readable medium, wherein the computer-readable medium comprises: (a) a code segment for defining a plurality of logical representations of the software requirements according to user input; (b) a code segment for defining, according to user input, a plurality of test scenarios that correspond to the software requirements; and (c) a code segment for processing a defined logical representation with a defined test scenario corresponding thereto to thereby generate a simulation result indicative of whether the software requirement corresponding to the processed logical representation needs alteration. A non-exhaustive list of computer-readable media on which the present invention may be implemented includes the hard drive of a computer, a compact disc (CD), one or more servers accessible over a network such as a local area network (LAN) or the Internet, or some combination thereof.

Through the present invention, multiple test scenarios can be established to verify expected results, to identify the correct logic that will capture "corner cases", to identify and isolate untestable or incomplete software requirements, and to reveal any "holes" in a software capability (missing software requirements). The rigorous testing provided by the present invention at an early phase of the development lifecycle allows practitioners of the present invention to greatly reduce the costs of software development related to late discovery of software requirement shortcomings.

These and other features and advantages of the present invention will be in part pointed out and in part apparent upon review of the following description and referenced figures.

BRIEF DESCRIPTION OF THE DRAWINGS

FIG. 3 depicts an exemplary set of output variables for a software capability and their range of allowable values;

FIG. 4 depicts software requirement 1 for the exemplary software capability of the present invention;

FIG. 5 depicts software requirement 2 for the exemplary software capability of the present invention;

FIG. 6 depicts software requirement 3 for the exemplary software capability of the present invention;

FIG. 7 depicts software requirement 4 for the exemplary software capability of the present invention;

FIG. 8 depicts software requirements 5–7 for the exemplary software capability of the present invention;

FIG. 12 is a screenshot of an exemplary variable table GUI for the SRLA tool of the present invention;

FIGS. 14(a)–(c) are screenshots of an exemplary requirements Structured Requirements Language (SRL) table GUI for the SRLA tool of the present invention;

DETAILED DESCRIPTION OF THE PREFERRED EMBODIMENT

Figures 1, 2:
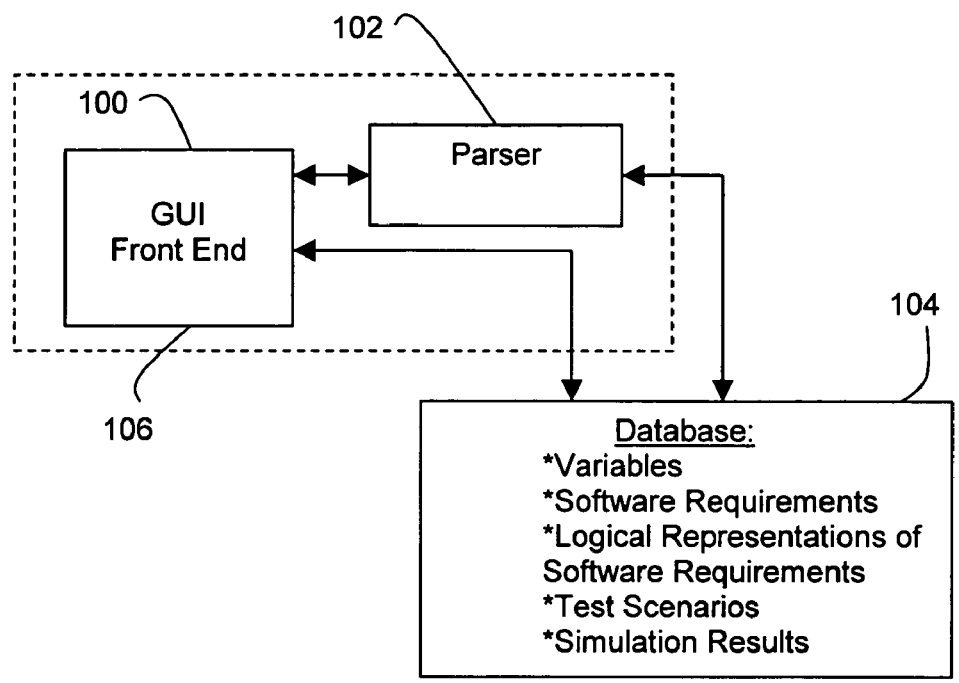
FIG. 1 depicts a block diagram overview of the present invention.
FIG. 2 depicts an exemplary set of input variables for a software capability and their range of allowable values.

The present invention is preferably implemented in software using a graphical user interface (GUI) front end 100, a parser 102, and a database backend 104, as shown in FIG. 1. The tasks performed by the GUI front end 100 and parser 102 are preferably executed by a processor 106 with the processor preferably being a desktop PC or workstation. Through the GUI front end 100, a user can import a list of input variables, output variables, localized internal variables all together with their associated value ranges. Next, still using the GUI front end, the user can compose and enter a set of logical statements with the defined variables. The logical statements represent the software requirements to be analyzed. The parser 102 provides syntax checking of the logical statements. Further, test scenarios for the software requirements represented by the defined logical statements can be entered using the GUI front end 100. The test scenarios may specify initial values for pertinent variables. Once the test scenarios are executed against the logical statements, the results can be evaluated to determine whether the software requirements/logical statements functioned as expected. As noted above, it is advantageous to perform these simulations early in the software development lifecycle, most preferably during the software requirement analysis phase.

The database 104, which may be any memory device capable of storing data electronically and interacting with a programmed processor, stores any variables, software requirements, logical representations of software requirements, test scenarios, and simulation results that are produced in the practice of the present invention, as will be explained in more detail below.

Generally, software requirements are expressed in the form of "shall" statements written with respect to the inputs and outputs of a specified processing transformation. The inputs and outputs correspond to real data elements/messages between software and hardware or between software components. Software requirements that are related may be grouped together, hierarchically or otherwise, to create a testable group. Additionally, software requirements may be accompanied by other representation artifacts such as flow diagrams, state transition tables, or the like.

In the preferred embodiment of the present invention, the software requirements are expressed in the form of "legally binding" statements using the emphatic form of a verb. This form has been mandated for large government software contracts in the 1980's and 1990's and is described in MIL-STD 490X SPECIFICATION PRACTICES as well as DOD-STD-2167A, both of which are incorporated herein by reference. These standards for software requirements have been incorporated into many engineering best practices and are readily understood by those of ordinary skill in the art.

While the preferred embodiment of the present invention utilizes software requirements expressed in the standardized form, it should also be understood that the present invention also encompasses the analysis of software requirements expressed in non-standardized formats. The software requirement may be any software specification which defines both the performance and functionality of the software product. Preferably, the software requirement is negotiated and accepted by both the software designer and the customer. Requirements may be represented not only textually using formal language (such as "shall" statements), but may also be represented graphically through models of relationships, data flows and the like.

As a way of illustrating the present invention, it is best to describe its operation in the context of a simple software development. From the description to follow of the various GUIs of the present invention and the processing performed by the present invention, the specific code implementation of the present invention will be readily apparent to those persons having ordinary skill in the art.

The exemplary software development is entitled "Fuel Tank Manager Capability". Its tasks are to (1) monitor fuel quantity in (three) tanks and (2) control valves that permit fuel flow from the tanks to an engine. Tanks A and B are main tanks, while tank C is a backup tank. Through control of the valves, the fuel quantity in tanks A and B must be kept approximately even. The valves to any one (or all) of the tanks may be commanded to be either open or closed. Fuel quantity in each of the tanks is monitored, as is the fuel depletion rate for each tank. From these monitored values, a total fuel quantity and a total fuel depletion rate are also defined.

The input variables for such a software development are shown in FIG. 2 in column 120 along with each variable's range of values in column 122. The variables Crew_Cmd_A, Crew_Cmd_B, and Crew_Cmd_C correspond to the commanded valve positions (either closed or open) for each respective tank A, B, or C. The variables Fuel_Quantity_A, Fuel_Quantity_B, and Fuel_Quantity_C correspond to the input fuel quantities for each respective tank A, B, or C. The value for fuel quantity is a number within the range 0.0 to 15.0 (the unit of measurement being gallons). A shutdown input variable corresponds to a command to immediately close all valves. It is expressed in Boolean terms of on or off (e.g., true/false or 1/0).

The output variables for the software development are shown in FIG. 3 in column 130 along with each variable's range of values in column 132. The variables Valve_A_Setting, Valve_B_Setting, and Valve_C_Setting correspond to the output position (either closed or open) of each respective valve for tanks A, B, and C. The output variables Fuel_Quantity_A, Fuel_Quantity_B, and Fuel_Quantity_C correspond to the fuel quantity in each respective tank (from 0.0 to 15.0 gallons), while the output variable Fuel_Quantity_Total represents the sum of the fuel quantities in each tank (which by derivation may range from 0.0 to 45.0 gallons). Lastly, the variables Fuel_Depletion_Rate_A, Fuel_Depletion_Rate_B, and Fuel_Depletion_Rate_C correspond to the depletion rate for fuel in each of the respective tanks (having a value in the range of 0.0 to 30.0 gallons/hour), while the variable Fuel_Depletion_Rate_Total represents the overall depletion rate for all three tanks (from 0.0 to 50.0 gallons/hour).

The relationships among these variables, as specified by the goals of the software development, are expressed as software requirements. FIGS. 4–8 illustrate the software requirements corresponding to the "Fuel Tank Manager Capability" described above. The first software requirement 140 is shown in FIG. 4. As can be seen, software requirement 140 is expressed in "shall" form and requires that the Fuel Tank Manager Capability calculate and provide the fuel quantity for each tank and the fuel depletion rate for each tank to the crew (provide output values therefor) at least once every 60 seconds. Items (a), (b), and (c) correspond to identification of how fuel quantities and depletion rates may be determined.

Software requirement 2 (identified with reference numeral 142 in FIG. 5) states that the Fuel Tank Manager Capability shall calculate the difference in fuel quantity between Tanks A and B at least once per minute. Item (a) identifies the formula for calculating this fuel quantity difference.

Software requirement 3 (reference numeral 144 in FIG. 6) states that the Fuel Tank Manager Capability shall maintain parity between the fuel quantities in Tanks A and B within 0.25 gallons. The value $Diff\_F_A$ calculated under software requirement 2 is used to make the parity determination. Item (a) of software requirement 3 specifies how parity is to be achieved—through control of the positions of the valves for Tanks A and B. If the absolute value of $Diff\_F_A$ is less than 0.25 (meaning that Tank A's fuel quantity is within Tank B's fuel quantity by plus or minus 0.25 gallons), then the values for both variables Valve_A_Setting and Valve_B_Setting are set equal to Open. If $Diff\_F_A$ is greater than 0.25 (meaning that the fuel quantity in Tank A has surpassed the fuel quantity in Tank B by more than 0.25 gallons) then the value for the variable Valve_A_Setting is set to Closed and the value for the variable Value_B_Setting is set to Open. It is intended that the system needs to continue fuel outflow from Tank A while stopping the outflow of fuel from Tank B to thereby allow the fuel quantities to approach equality with respect to each other. However, the requirement contains an exemplary intentional error by specifying the reverse; fuel outflow from Tank A is stopped while allowing the outflow of fuel to continue from Tank B. The present invention will operate to bring this error to the attention of a user. If $Diff\_F_A$ is less than −0.25 (meaning that the fuel quantity in Tank B has surpassed the fuel quantity in Tank A by more than 0.25 gallons) then the value for the variable Valve_A_Setting is set to Open and the value for the variable Value_B_Setting is set to Closed. It is intended that the system needs to continue fuel outflow from Tank B while stopping the outflow of fuel from Tank A to thereby allow the fuel quantities to approach equality with respect to each other. However, by specifying the reverse, the requirement contains an exemplary intentional error that the present invention will uncover; fuel outflow from Tank B is stopped while allowing the outflow of fuel to continue from Tank A. Therefore, depending upon the value of $Diff\_F_A$, as determined from the tanks' respective fuel quantities, software requirement 3 governs the values for the variables Valve_A_Setting and Valve_B_Setting.

Software requirement 4 (reference numeral 146 in FIG. 7) states that when the fuel in tanks A and B is exhausted, the Fuel Tank Manager Capability shall provide fuel from backup Tank C. Item (a) defines when Tanks A and B are deemed exhausted (when their respectively fuel quantity variables possess a value less than 0.25). Item (b) notes that fuel is provided from Tank C by setting the value of the variable Valve_C_Setting to Open.

Software requirements 5, 6, and 7 are shown illustratively in FIG. 8 as reference numeral 148. Software requirement 5 states that when the system is at start-up, the Fuel Tank Manager Capability shall command fuel flow from Tanks A and B. Software requirement 6 states that when a fuel flow command is received from the crew, the Fuel Tank Manager Capability shall command the appropriate settings for the valves. Software requirement 7 states that when the system shuts down, the Fuel Tank Manager Capability shall command that fuel flow be stopped from all three tanks. Item (a) notes that fuel flow is commanded by setting the variables Valve_A_Setting, Valve_B_Setting, and Valve_C_Setting to the appropriate value (Open/Closed). Item (b) notes that the fuel flow commands are received from the crew in the form of values for the variables Crew_Cmd_A, Crew_Cmd_B, and Crew_Cmd_C.

The goal of the present invention is to test the viability of these software requirements. Toward this end, the software requirements logic analyzer (SRLA) tool of the present invention has been developed. Preferably, the SRLA tool is a MS Access database application supported by MS Visual Basic modules. However, as should be appreciated by those of ordinary skill in the art, alternate means of implementation using other programming languages, database applications, or the like may be used.

Figure 9:
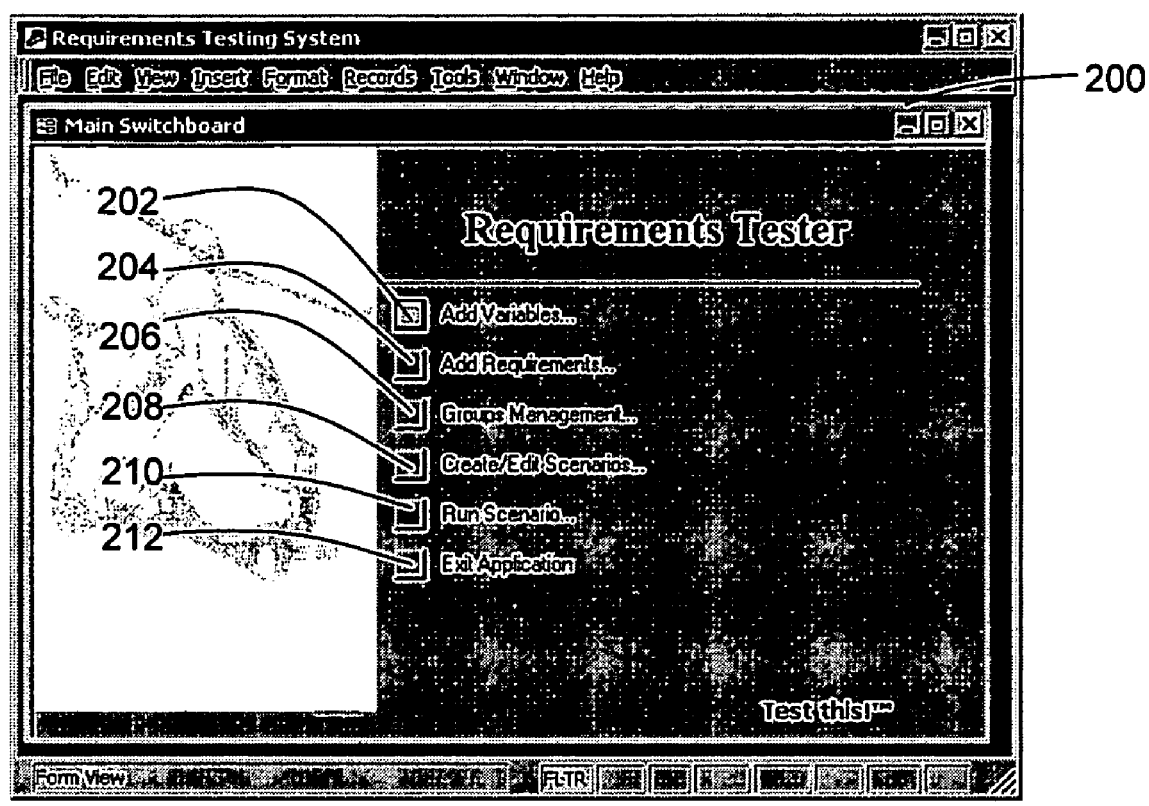
FIG. 9 is a screenshot of an exemplary initial GUI menu for the Software Requirements Logic Analyzer (SRLA) tool of the present invention.

FIG. 9 illustrates an initial GUI 200 presented to a user upon accessing the SRLA tool. From the initial GUI 200, the user is presented with a variety of options, including options to (1) add/edit variables and their related parameters through selection of icon 202, (2) add/edit/enter software requirements, both in their original forms (as shown in FIGS. 4–8) or in their logical representation form (as will be discussed below), through selection of icon 204, (3) perform group management tasks, such as grouping related software requirements and variables into testable groups, through selection of icon 206, (4) create/edit test scenarios by selecting any software requirements or groups and setting their initial and expected variable values (via selection of icon 208), and (5) run scenarios to execute tests of created scenarios on the software requirements (via selection of icon 210). The user also preferably is given the option of exiting the SRLA tool through selection of icon 212.

Figure 10:
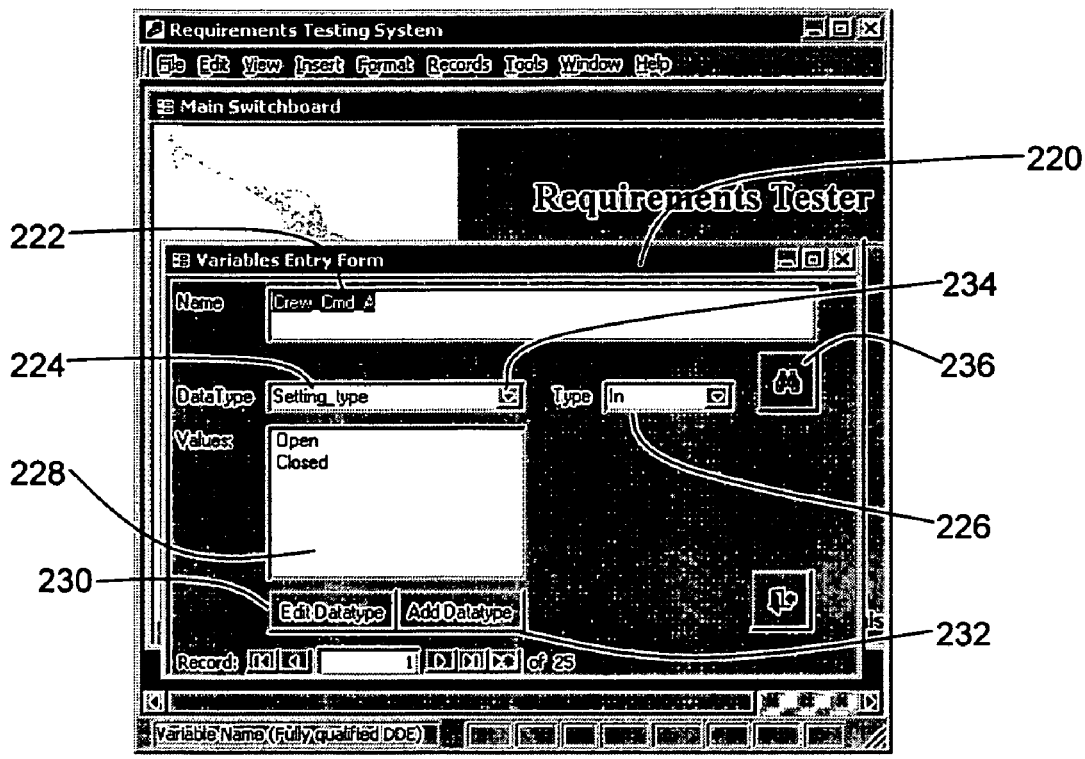
FIG. 10 is a screenshot of an exemplary variable entry GUI for the SRLA tool of the present invention.
Figure 11:
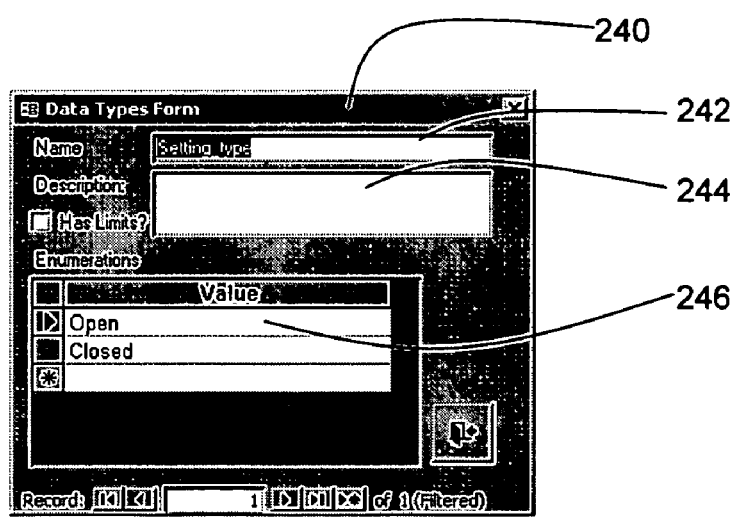
FIG. 11 is a screenshot of an exemplary data type entry GUI for the SRLA tool of the present invention.

Adding/Editing Variables:

FIG. 10 illustrates a GUI 220 for user definition of variables. The user can enter a variable name in variable name field 222 (in this example, the entered variable name is Crew_Cmd_A). Preferably, each variable is assigned a data type that identifies the allowable values that the variable may possess. Icon 232 may be selected to add a new data type to the system. In the example of FIG. 10, the selected data type for Crew_Cmd_A is "Setting_type" which exhibits potential values of "Open" or "Closed". FIG. 11 illustrates the GUI 240 for data type addition. The user may specify a name for the data type in field 242. Additionally, a description for the data type may be added in field 244. Lastly, the potential values for the data type can be entered in field 246. In the example of FIG. 11, the data type name is "Setting_type" and its enumerated values in field 246 are "Open" and "Closed". Returning to FIG. 10, it can be seen that these values populate the value field 228 upon selection of the data type "Setting_type" in field 224. Further, a drop down menu of available data types may be accessed upon selection of arrow 234, a technique well known in the art. Upon selection of a data type listed in the drop down menu, field 228 is automatically populated with the values associated with the data type. Further, it should be noted that selection of the "Edit Data Type" icon 230 will call GUI 240 to the user's screen with its fields already populated with the attributes of the data type to be edited. GUI 220 also preferably includes a type field 226 that allows the user to identify the variable as either an input variable, an output variable, an input/output variable, or a local/internal variable.

Through selection of icon 236, the user can view a table listing all entered variables. FIG. 12 shows a GUI 250 depicting such a table. Column 252 of the table identifies each variable's name. Column 254 identifies each variable's type. The variables Crew_Cmd_A, Crew_Cmd_B, Crew_Cmd_C, and Shutdown are denoted as input variables. The variables Fuel_Depletion_Rate_A, Fuel_Depletion_Rate_B, Fuel_Depletion_Rate_C, Fuel_Depletion_Rate_Total, Fuel_Quantity_Total, Valve_A_Setting, Valve_B_Setting, and Valve_C_Setting are denoted as output variables. The variables Crew_Cmd_A_Recvd, Crew_Cmd_B_Recvd, Crew_Cmd_C_Recvd, Diff_FA, One_Minute_Trigger, Previous_Fuel_Quant_A, Previous_Fuel_Quant_B, Previous_Fuel_Quant_C, Previous_Fuel_Quant_Total, and Startup are denoted as local variables. Lastly, the variables Fuel_Quantity_A, Fuel_Quantity_B, and Fuel_Quantity_C are denoted as input/output variables. Column 256 identifies each variable's data type (either Setting_type, Boolean, or Float in this example).

Figure 13:
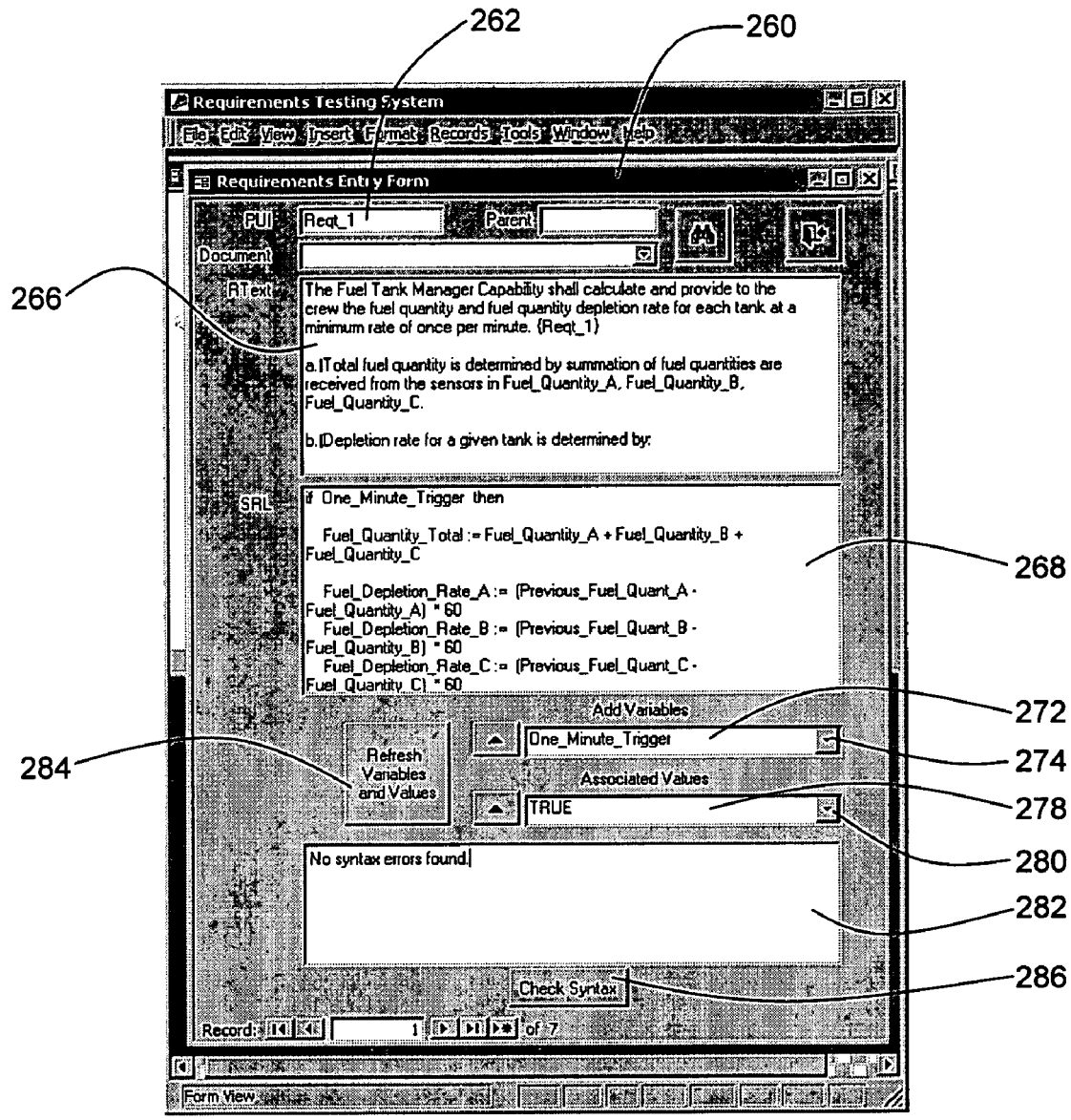
FIG. 13 is a screenshot of an exemplary requirements entry GUI for the SRLA tool of the present invention.

Adding/Editing/Testing Software Requirements:

FIG. 13 depicts a preferred GUI 260 for entry of software requirements. The software requirements entered via GUI 260 are the software requirements that are analyzed by the present invention. The text box 262, which is labeled PUI for Project Unique Identifier, contains a name for the requirement. Preferably, the user enters the software requirement as text in the Rtext box 266. As can be seen in FIG. 13, the entered software requirement is software requirement 1 from FIG. 4.

Once the software requirement is entered in a textual format in box 266, the user preferably translates the requirement text to a logical format that is parsable into programming code.

A preferable logical format for the present invention is a pseudo-code or grammar that specifies an unambiguous set of rules for a language, such as structured requirements language (SRL) described in more detail hereinafter. A copy of the Backus Naur Form (BNF) version of SRL is attached in Appendix A.

The SRL version of the software requirement of box 266 is shown in SRL box 268. As can be seen, the logical expression of software requirement 1 is an if statement followed by four equations for calculating the tanks' overall fuel quantity and individual fuel depletion rates. The condition found in software requirement 1 that the quantity and depletion rates be calculated once per minute is expressed as an "if" statement using the variable "One_Minute_Trigger" (which is configured to exhibit the value "True" every 60 seconds). Thus, according to the logical expression of software requirement 1, whenever One_Minute_Trigger goes true, the variables Fuel_Quantity_Total, Fuel_Depletion_Rate_A, Fuel_Depletion_Rate_B, and Fuel_Depletion_Rate_C are calculated. The software requirement's logical expression is written in terms of input/output/local variables and their potential values. SRL uses operators borrowed from programming languages to create the logical relationships, such as ":=" for assigning a value to a variable, "=", "<", etc. as comparison operators, and "*" as a multiplication operator.

The user can preferably quickly import variables to the SRL box 268 using the "Add Variables" icon 270. Using a drop down menu (not shown) accessed by arrow 274 and shown in box 272, the user can select variables for entry into the SRL box 268. Preferably, the drop down menu accessed by arrow 274 is populated with all of the variables previously entered by the user for the software capability. Further, the user can also import values into the SRL box that are associated with each variable using the "Associated Values" icon 276. For example, when the variable One_Minute_Trigger is added, either of its associated values True and False (One_Minute_Trigger's data type is Boolean) can be quickly imported into the SRL box 268. Using arrow 280, the user can access a drop down menu (not shown) that is populated with available values for the variable. As can be seen in FIG. 13, the value True has been selected for One_Minute_Trigger. By providing the "Associated Values" tool of icon 276, text box 278, and arrow 280 (with drop down menu), the likelihood of user entry of a variable value that is not permitted for the variable is decreased because the user will have a list of acceptable values presented to him/her for entry. The "refresh" icon 284 may be selected by the user to refresh all of the variables and values selected for the software requirement.

SRL is a simple lightweight programming language that supports case statements, lookup tables, nested logical expressions, and mathematical equations. Behind the SRL is a grammar specification and parser, preferably created using the NorKen Technologies ProGrammar® parser generator manufactured by NorKen Technologies of Flower Mound, Tex. It should be noted, however, that other parser generators may be used in the practice of the present invention. The parser parses the logical expression against a definition of the grammar to determine whether the logical expression is valid. The parser then breaks a valid SRL expression into nodes on a tree. Thereafter, a software module (preferably a Visual Basic module, although other coding languages may be used) traverses the nodes in the tree using a recursive descent algorithm. This Visual Basic module then evaluates the SRL expression according to a user-defined scenario, as will be explained in more detail below.

SRL grammar is extensible, and both the SRL database and its Visual Basic module set can be extended to handle more complex data structures and operations. However, it is preferred by the inventors that the complexity of SRL be kept to a minimum. First, it is preferred that the SRL capabilities be kept within the widest possible range of users. Second, when testing software requirements at the software requirements analysis phase of the software development cycle, it is preferred that complexity be kept to a minimum because such time-consuming details are to be undertaken in later development phases only after the high level concepts are found feasible. A preferred target user of the present invention is not necessarily a software engineer but rather a systems engineer or a test engineer, often trained in fields such as electrical, mechanical or aeronautical engineering, or physics. The user is preferably focused on what the software capability must deliver, and not on how it will be done. The purpose of software requirement testing is not to develop idealized code for the software requirement, but rather to test the feasibility of high level design concepts. While the software requirements will undoubtedly most likely employ a wide range of logical and mathematical expressions (such as the operators discussed above), the SRL tool seeks to maintain the expressions in procedural nature rather than an algorithmic nature. As an aid in ensuring that the SRL expression uses proper syntax, a "check syntax" icon 286 is provided. Upon selection of the check syntax icon 286, the parser operates on the logical expression in box 268 to check for syntax errors. Any errors are preferably brought to the user's attention for correction.

Figure 14B:
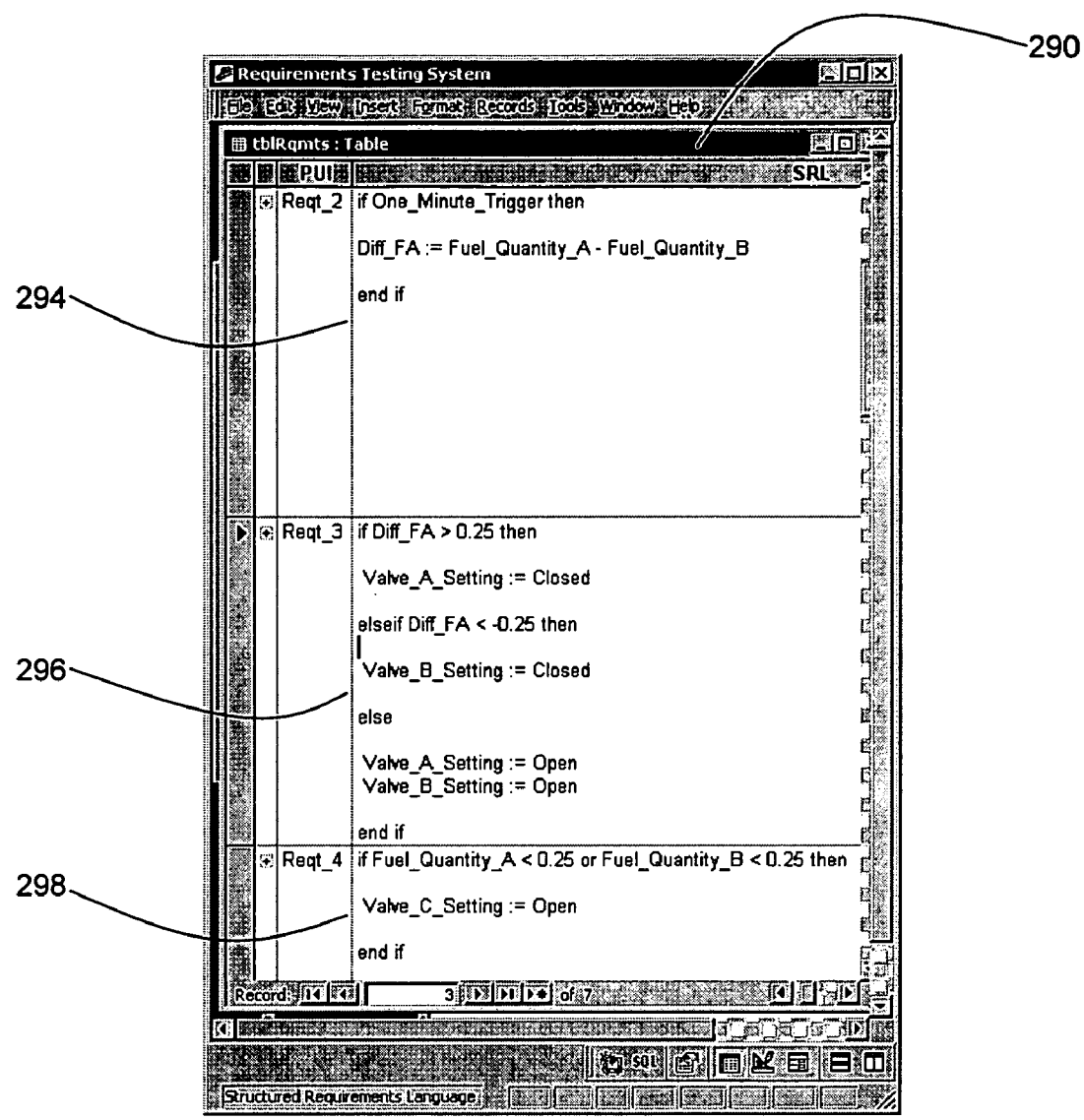
Figure 14C:
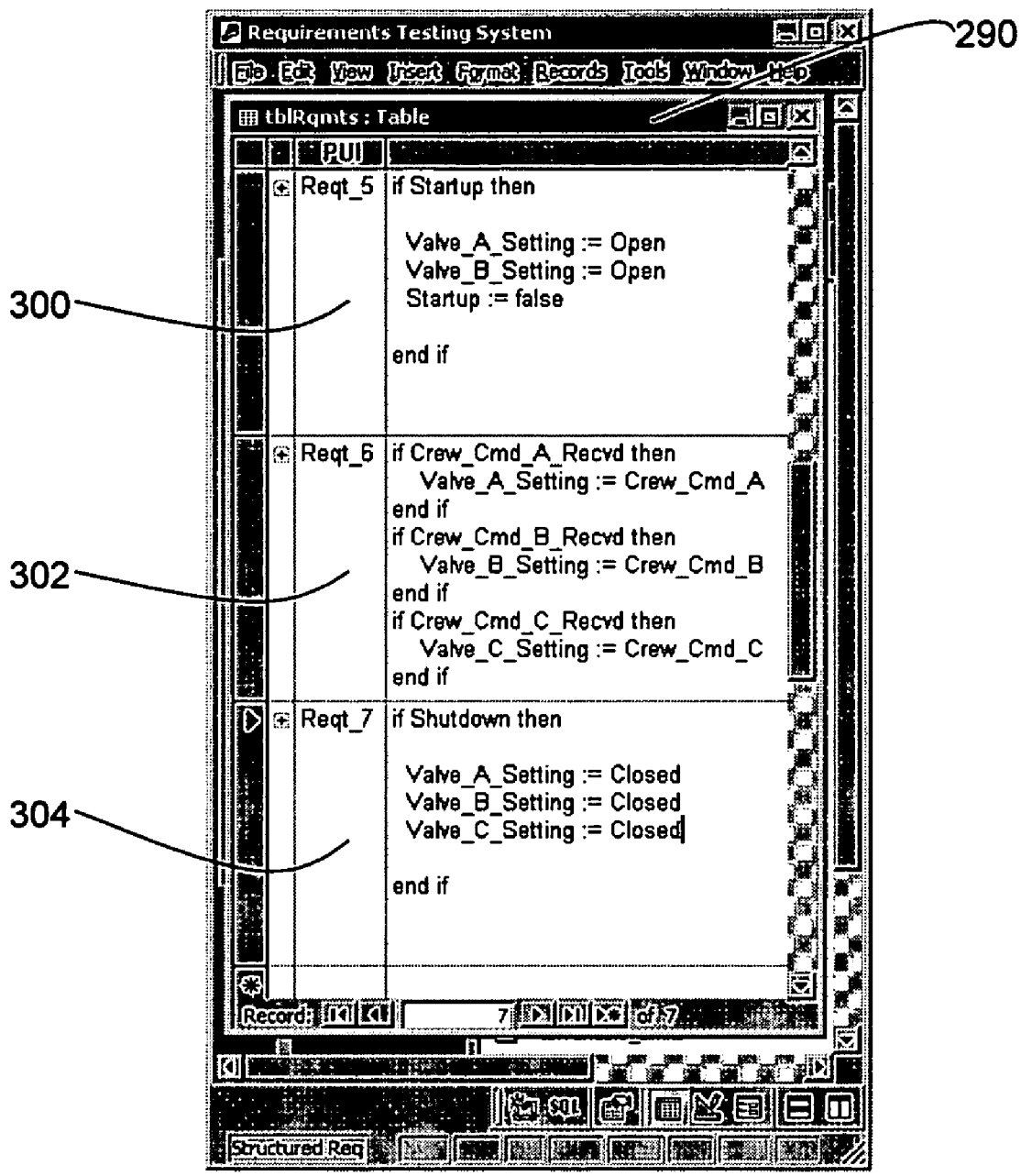

As each software requirement is entered into the database as a logical expression, the user can view the logical representations of the software requirements in GUI 290 shown in FIGS. 14(*a*)–(*c*). The logical representation 292 of software requirement 1 can be seen in FIG. 14(*a*). FIG. 14(*b*) shows the logical representations 294, 296, and 298 of, respectively, software requirements 2, 3, and 4. Lastly, FIG. 14(*c*) shows the logical representations 300, 302, and 304 of, respectively, software requirements 5, 6, and 7.

Groups Management of Related Software Requirements:

For testing purposes, one or more software requirements may be related. That is, the analysis of one software requirement may depend upon whether another software requirement is functioning properly. For example, it can be said that software requirements 2 and 3 are related. Software requirement 3 seeks to maintain fuel quantity parity between Tanks A and B, and does so based on the value of the fuel quantity differential variable Diff_$F_A$. Software requirement 2 defines how Diff_$F_A$ is calculated. Thus, it is preferable to test software requirements 2 and 3 as a group because if Diff_$F_A$ is improperly defined by software requirement 2, the feasibility of software requirement 3 cannot be independently evaluated. Toward this end, the present invention provides a tool for associating related software requirements into testable groups.

Figure 15:
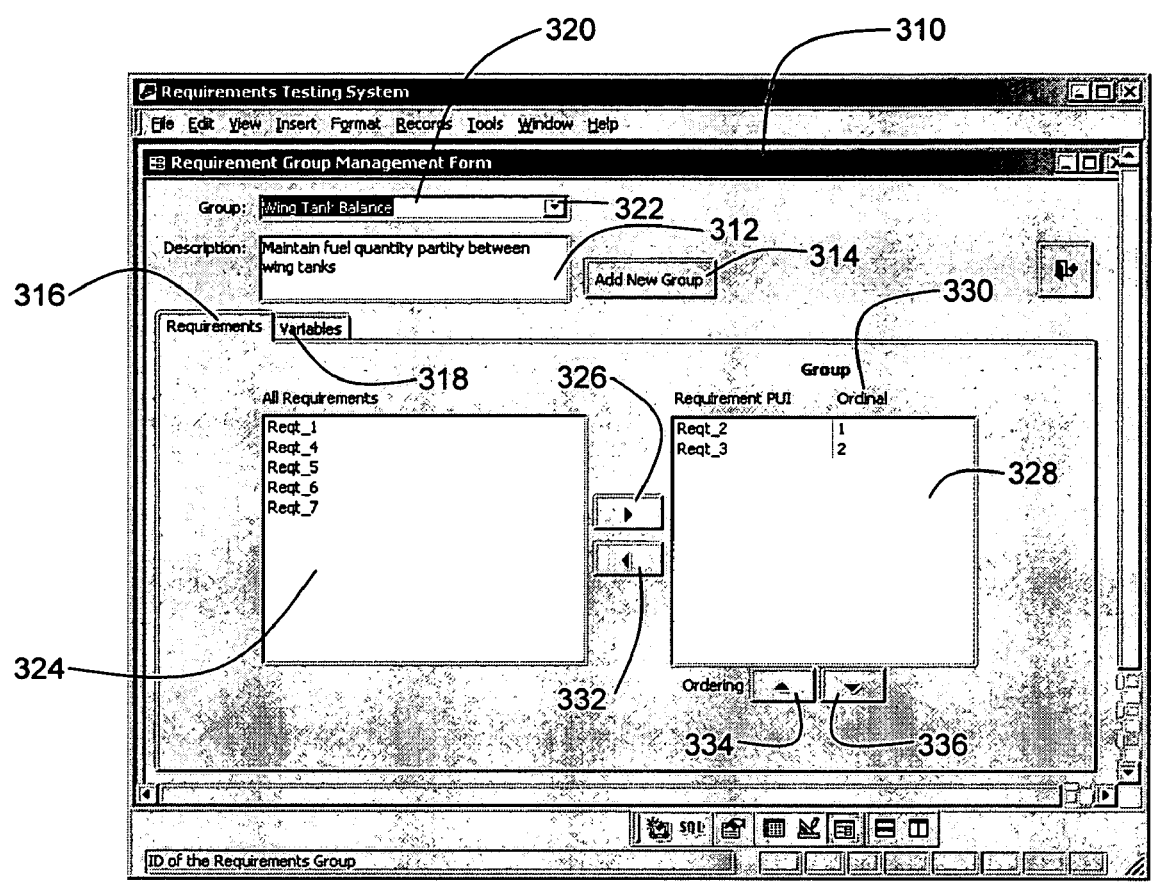
FIG. 15 is a screenshot of an exemplary groups management GUI for the SRLA tool of the present invention, wherein the requirements folder tab is active.

FIG. 15 is a screenshot of a preferred groups management GUI 310. Using GUI 310, the user may create a group of related requirements for testing. Text box 320 allows the user to enter a group name. Arrow 322 allows the user to select a group through access to a drop down menu (not shown) populated with previously created groups for the software capability. New groups may be added to the database upon selection of the "Add New Group" icon 314. In this example, wherein a group for the related software requirements 2 and 3 is created, the name of the group is "Wing Tank Balance". Preferably, the user also enters a text description of the group in box 312. Using tabs 316 and 318, the user can respectively control the requirements and variables for the group.

In FIG. 15, tab 316 is active (for control of the group's software requirements). Box 324 is populated with the software requirements found in the database for the software capability. Using arrow 326, the user can add any of those software requirements to the group. Box 330 lists the software requirements the user has added to the group. In this example, it can be seen that the group "Wing Tank Balance" comprises software requirements 2 and 3. The hierarchical or ordinal relationship between the software requirements making up the group are shown in column 330 of box 328. In this example, software requirement 2 is of order 1 while software requirement 2 is of order 2 because software requirement 3 is conditional upon software requirement 2 (because software requirement 3 uses the value of the variable calculated by software requirement 2 to guide its decision-making on valve settings). Ordering arrows 334 and 336 are preferably used to set each software requirement's ordinal value. However, it should be noted that ordinal value could be automatically set by the order in which software requirements are added to the group via selection with arrow icon 326. Arrow icon 332 is for deleting a requirement from the group.

Figure 16:
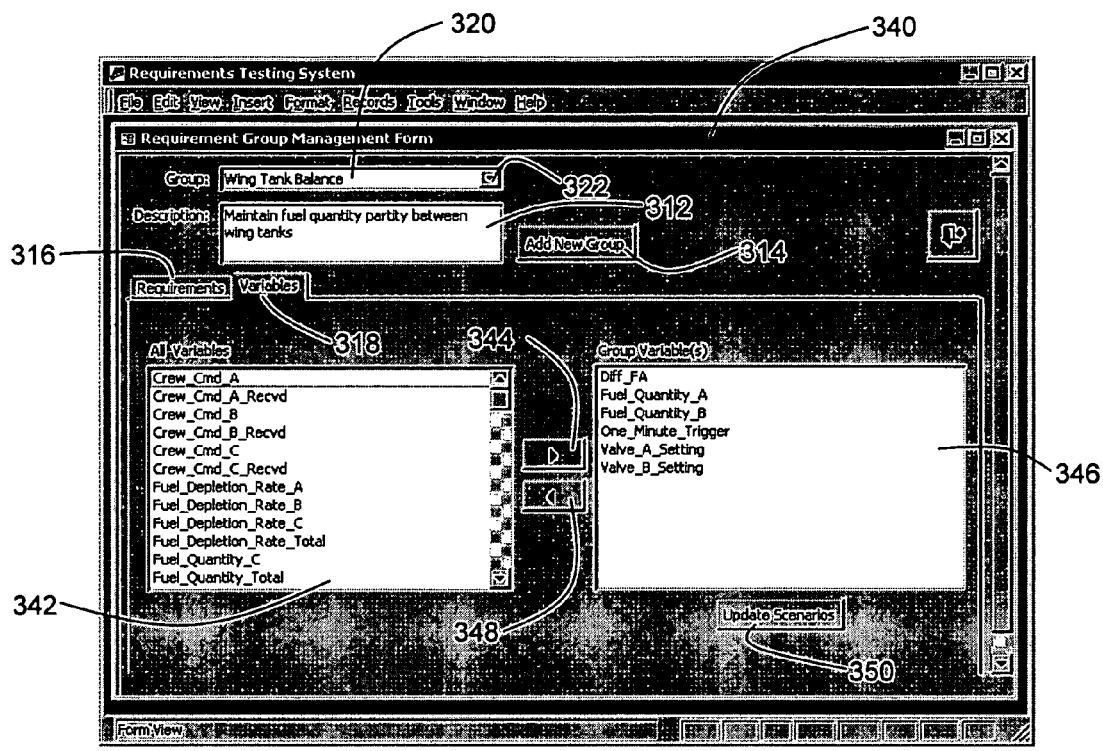
FIG. 16 is a screenshot of an exemplary groups management GUI for the SRLA tool of the present invention, wherein the variables folder tab is active.

FIG. 16 is a screenshot depicting the GUI 340 for groups management when the user has selected the variables folder tab 318. Box 342 in GUI 340 identifies all variables available of for inclusion in the group. Through selection of a variable in box 342 and selection of arrow icon 344, the user can designate group variables, which are shown in box 346. A group variable may be deleted from the group upon selection of arrow icon 348. It should be noted that the variable control provided in the variable folder of GUI 340 may be modified through automatic loading of variables upon user selection of requirements with the requirement folder of GUI 340. That is, once the requirements of the group have been selected by the user (see FIG. 15 and accompanying description), the group variables in box 346 would be automatically defined.

Further, upon selection of the "Update Scenarios" icon 350 any scenarios that are affected by modification of variables through the group management GUI will have their settings altered. For variables deleted from the group, corresponding references to those variables found in a scenario are deleted. For new group variables, initial/expected values will need to be defined.

Adding/Editing Test Scenarios:

With the present invention, once a software requirement or a software requirement group has been established, that requirement or group may be tested using a user-specified test scenario. The user defines a test scenario using the test scenario entry GUI 360 depicted in FIG. 17. When defining a test scenario, the user preferably specifies at least initial values for the variables of a software requirement, and more preferably, specifies both initial values for variables as well as the expected values for the variables upon successful operation of the software requirement.

Using GUI 360, the user can enter a name for the test scenario in box 362. In this example, where the Wing Tank Balance group is having a test scenario defined therefor, the test scenario name is "Fuel Tank Balance 1". Preferably, the user is also provided text box 364 in which he/she can enter a description of the test scenario. Each test scenario may also be assigned an ID number 368, which may be assigned by the user or automatically by the software. Further, the software requirement or testable group for which the test scenario is created is specified by the user in the box 366. Through selection of arrow 394, a drop down menu (not shown) can be accessed that lists software requirements or groups that are available for selection.

The "Update Scenario" icon 370 is selectable by the user to ensure that the scenario attributes in the database are current with what was modified on the screen. The "Copy Scenario" icon 372 is selectable by the user to copy the attributes of the present test scenario into a new test scenario. The "Delete Scenario" icon 374 is selectable by the user to delete the present scenario from the database. Lastly, the "Update Variables" icon is selectable by the user to automatically populate box 378 with the variables of the software requirement or group identified in box 366.

Figure 17:
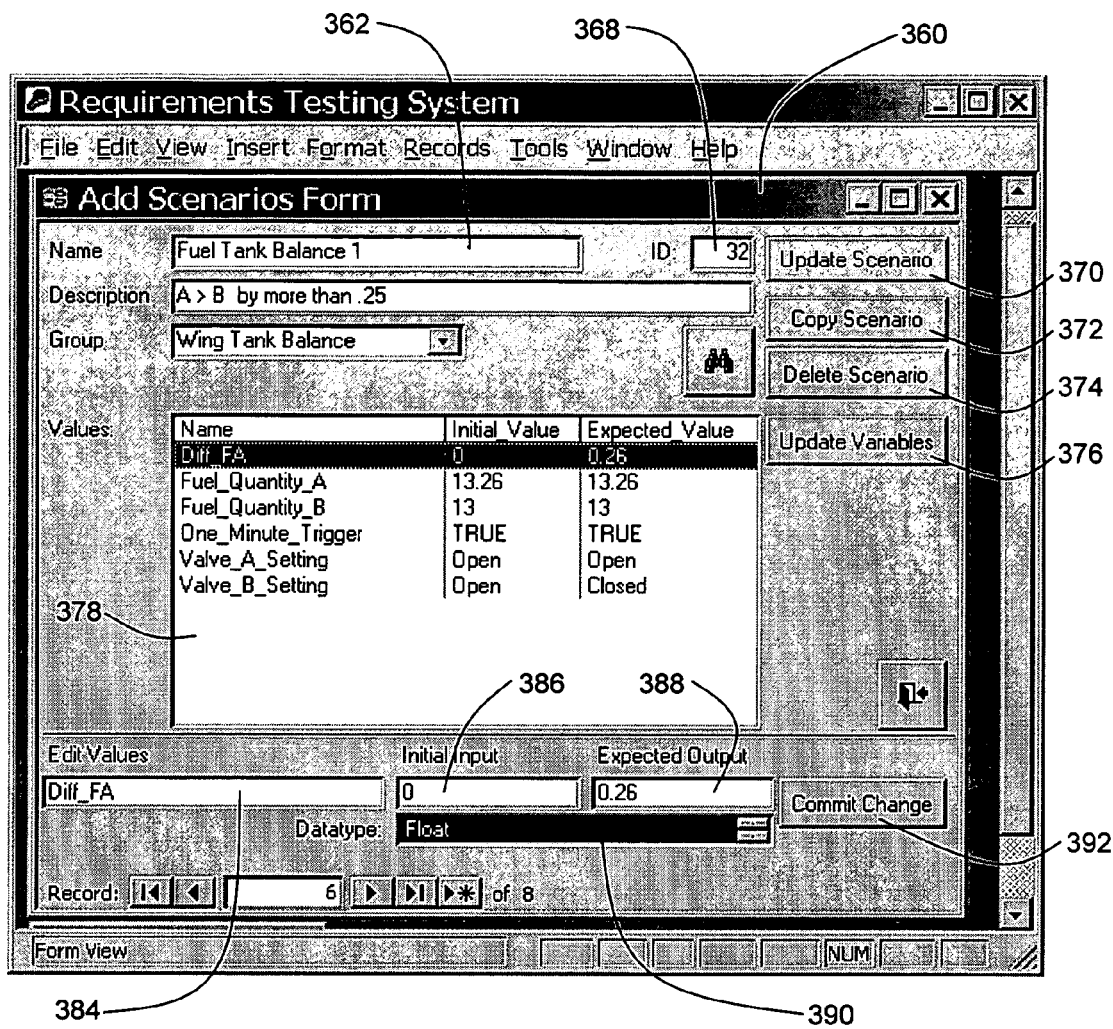
FIG. 17 is a screenshot of an exemplary scenario entry GUI for the SRLA tool of the present invention.

Variable box 378 identifies the variable attributes associated with the test scenario. Each variable entry in box 378 is accompanied by a corresponding initial value 380 and expected value 382. The initial and expected values for the variable identified in field 384 may be entered by the user in fields 386 and 388 respectively. Preferably, field 384 is automatically populated with a variable in box 378 that is selected by the user. However, the user may also type that variable name into field 384. The initial variable value specifies the value that a particular variable is to possess at the start of testing, while the expected variable value specifies the value for the particular variable that is expected at the conclusion of successful operation of the software requirement or group. The field 390 identifies the data type for the variable whose initial and expected values are being edited. In the example of FIG. 17, the variable whose initial and expected values are being edited is named $Diff\_F_A$. The initial value for $Diff\_F_A$ is specified as 0 and the expected value of $Diff\_F_A$ upon completion of testing is 0.26 (because the quantities for Tanks A and B are initially 13.26 and 13 respectively, meaning that if $Diff\_F_A$ is properly calculated, its value will be 0.26. The "Commit Changes" icon loads the values in boxes 386 and 388 into box 378.

Upon review of software requirements 2 and 3, when the initial variable values are: (1) 0 for $Diff\_F_A$, (2) 13.26 for Fuel_Quantity_A, (3) 13 for Fuel_Quantity_B, (4) True for One_Minute_Trigger, (5) Open for Valve_A_Setting, and (6) Open for Valve_B_Setting, the following variable values are expected upon successful operation of software requirements 2 and 3: (1) $Diff\_F_A$ will be 0.26 (the difference between the fuel quantities in Tanks A and B), (2) 13.26 for Fuel_Quantity_A, (3) 13.0 for Fuel_Quantity_B, (4) True for One_Minute_Trigger, (5) Open for Valve_A_Setting, and (6) Closed for Valve_B_Setting, as would be expected in order to achieve parity between the fuel quantities in Tanks A and B as mandated by software requirement 3.

Evaluating Software Requirements or Groups Using Test Scenarios:

Using the "Run Scenario" feature of the present invention, the test scenario shown in FIG. 17 can be tested against the logical representations of software requirements 2 and 3 (which have been grouped together as the software requirement group Wing Tank Balance). When testing a software requirement or a group with a test scenario, the parser processes the SRL form of the requirement/group (as described above) to create nodes on a tree, as is understood by those of ordinary skill in the art, and a software module, preferably the Visual Basic module described above, thereafter operates on the parsed requirement/group using the initial values. The preferred Visual Basic module traverses the nodes in the tree using a recursive descent algorithm as described below in connection with FIG. 19.

Figure 18:
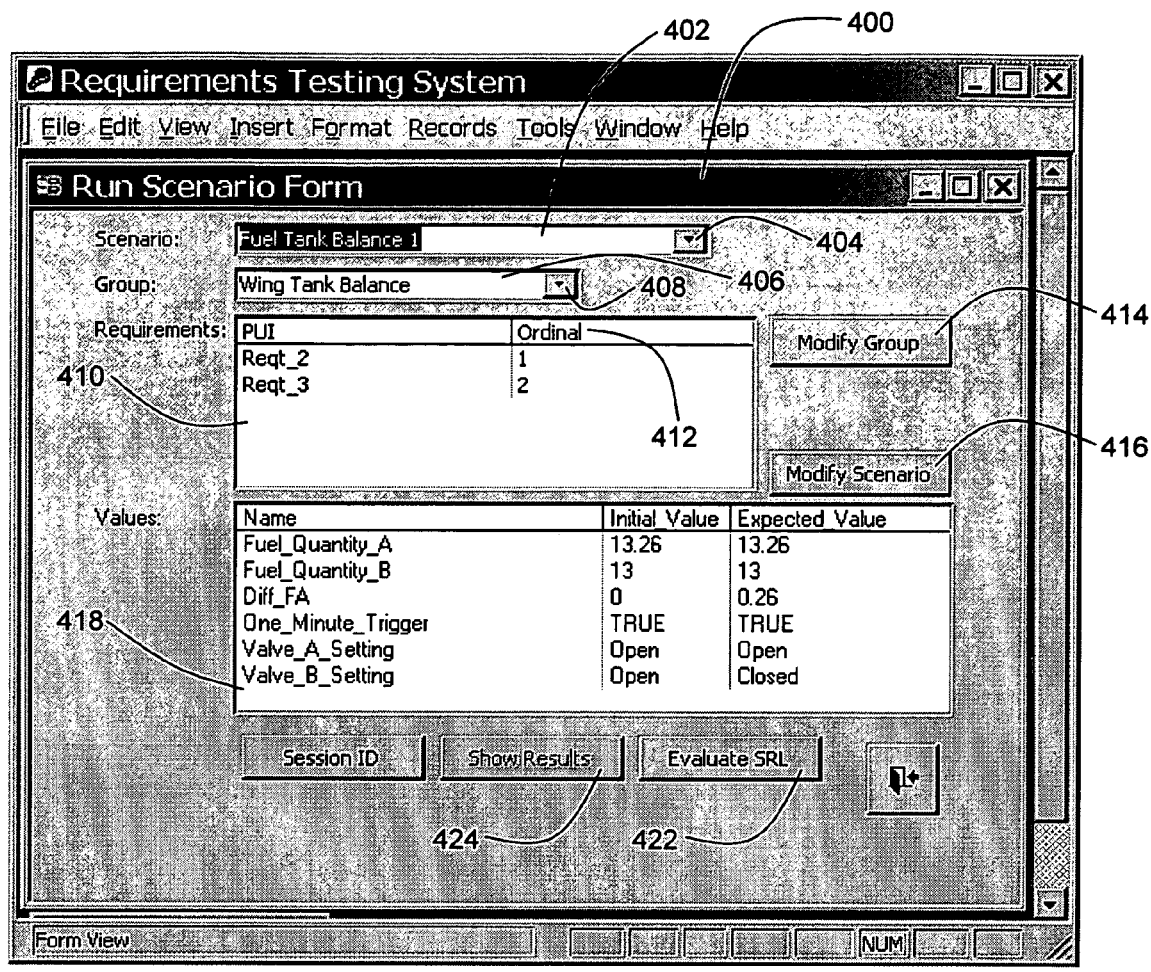
FIG. 18 is a screenshot of an exemplary scenario testing GUI for the SRLA tool of the present invention.

FIG. 18 is a screenshot depicting a preferred GUI 400 for running a scenario. The name of the scenario to be tested is preferably entered by the user in field 402, either through typing or selection from a drop down menu (not shown) that is populated with a list of test scenarios created for the software capability and accessed by arrow 404. Further, box 406 is preferably automatically populated with the software requirement or group that is associated with the selected test scenario. Alternatively, if no test scenario has been selected, the user may enter the name of the requirement/group in field 406 either through typing or selection from a drop down menu (not shown) that is populated with a list of requirements/groups created for the software capability and accessed by arrow 408. In such cases, it is preferable that the drop down menu accessed by arrow 404 be limited to any test scenarios associated with the selected requirement/group.

Upon selection of a test scenario and a requirement/group to be analyzed, box 410 of GUI 400 identifies the software requirement(s) to be tested including each requirement's ordinal value 412 (if a group is being tested). Further, box 418 of GUI 400 identifies the variable names, variable initial values, and variable expected values for the test scenario. Preferably, box 418 depicts the same table as shown in box 378 of GUI 360 (see FIG. 17).

Further still, the user is also provided with opportunities to further edit either the software requirement/group and/or the test scenario. Upon selection of the "Modify Group" icon 414, the groups management GUI 310 (see FIG. 15) is launched. Upon selection of the "Modify Scenario" icon 416, the scenario entry GUI 360 is launched. The modify icons 414 and 416 on GUI 400 allow the user to easily navigate among features of the present invention as needed.

Lastly, once the user feels that the requirement/group is ready for evaluation with the test scenario, he/she may select the "Evaluate SRL" icon 422. Once icon 422 has been selected, the requirement/group values are assigned their initial values as specified by the test scenario, and the logic of the SRL is processed with any transformation of variable values being recorded.

Figure 19:
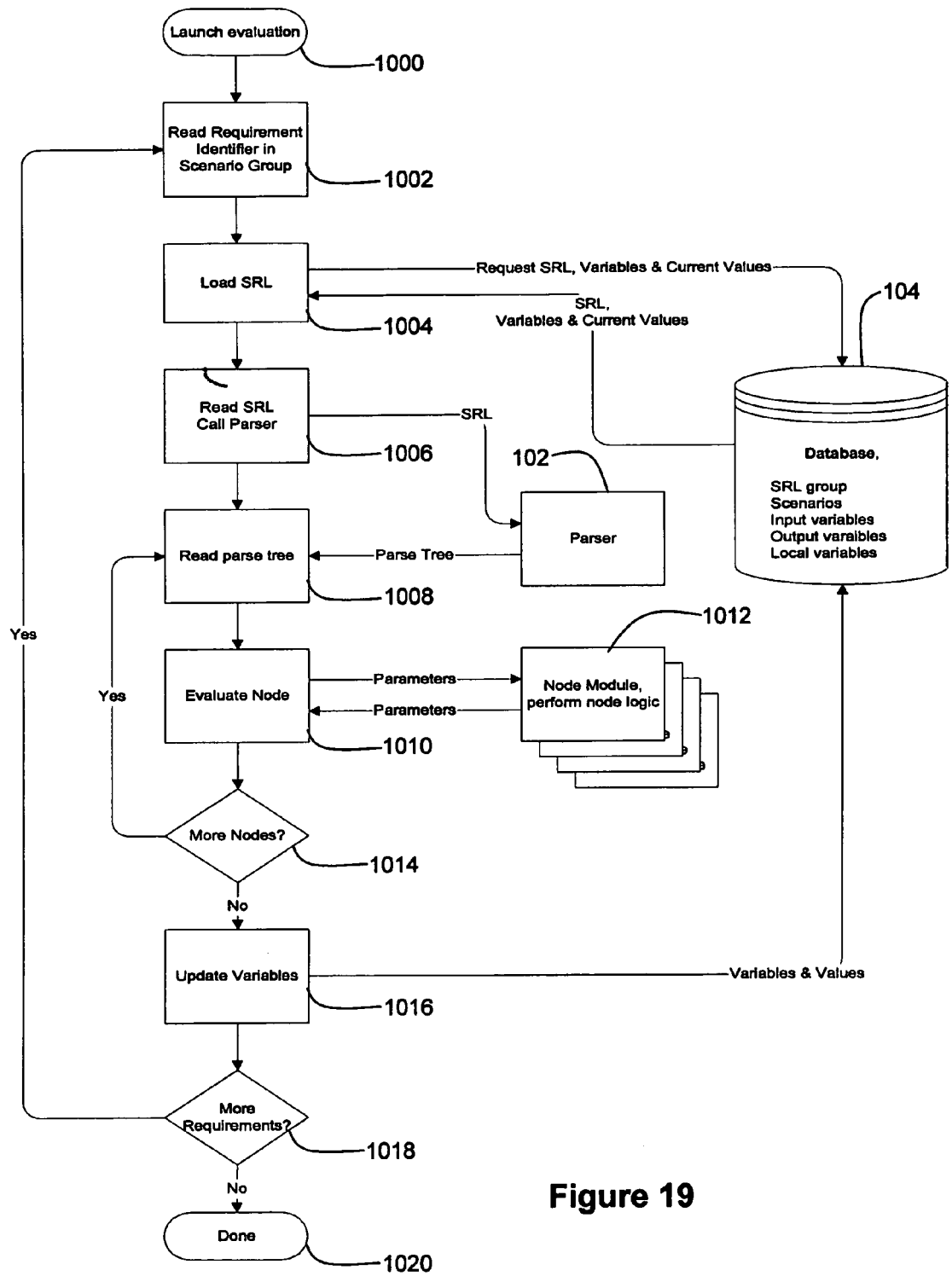
FIG. 19 is a flowchart depicting the processing flow for evaluation of a software requirement/group.

FIG. 19 is a flowchart illustrating an exemplary process for evaluating a software requirement/group. At step 1000, the user selects the "Evaluate SRL" icon 422 from GUI 400 (see FIG. 18), to thereby launch the SRL evaluation. When the evaluation is launched, a requirement or group of requirements are identified, along with their corresponding variables, both with initial and expected values. At step 1002, for evaluating groups, the process identifies each requirement in the group and the processing order for those requirements. Next, at step 1004, the database 104 is queried to obtain the SRL version of the requirement identified for processing at step 1002. The database 104 returns not only the SRL version of the requirement, but also the requirement's variables, the variables' initial values, and the variables' expected values.

Next, at step 1006, the returned SRL is read and passed to parser 102. Parser 102 parses the SRL expression and returns a parse tree, which is a data structure organized by grammatical elements of the language, as is known in the art. Portions of the SRL expression (known as tokens) are placed in specific positions of this tree structure. At step 1008, the returned parse tree is read to identify what actions are to be performed. The parse tree's structure not only provides for this information, but also allows for systematic and comprehensive traversal.

Certain positions in the tree structure comprise discrete processing units, known as nodes, where the software module can reference and act upon variables. As the parse tree is traversed and a node is identified (step 1010), the module is called (step 1012) to perform the processing logic for the identified node. Variables to be referenced or acted upon are passed in and out of the node module as parameters during step 1012. During this step, variables new values are computed according to the logic of the SRL. At step 1014, the process returns to step 1008 and traverses any remaining nodes in the parse tree.

Once each node of the parse tree has been processed, at step 1016 the variable values returned from previous iterations of step 1012 are returned to the database 104. Thus, any subsequent requirements to be evaluated for the group will have access to current variable values. At step 1018, the process checks whether any additional requirements for the group still need to be evaluated. If so, the process returns to step 1002 to identify the next requirement of the group. Otherwise, the process ends at step 1020. At this point, a user can view the results of the evaluation, as described below.

Figure 20A:
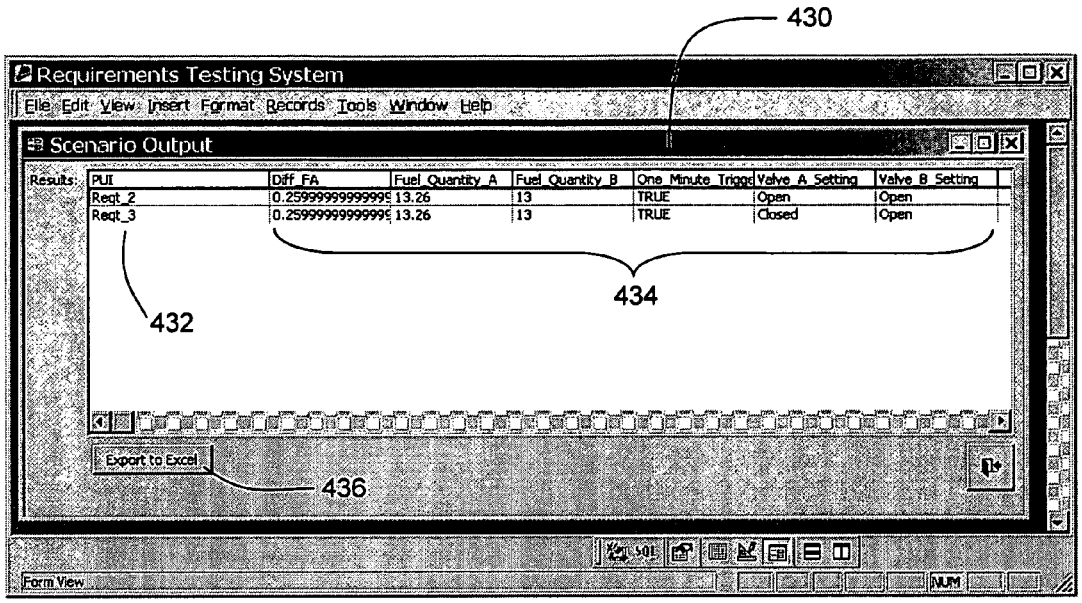
FIGS. 20(a)–(c) are screenshots of a various exemplary scenario output reports for the SRLA tool of the present invention.
Figure 20B:
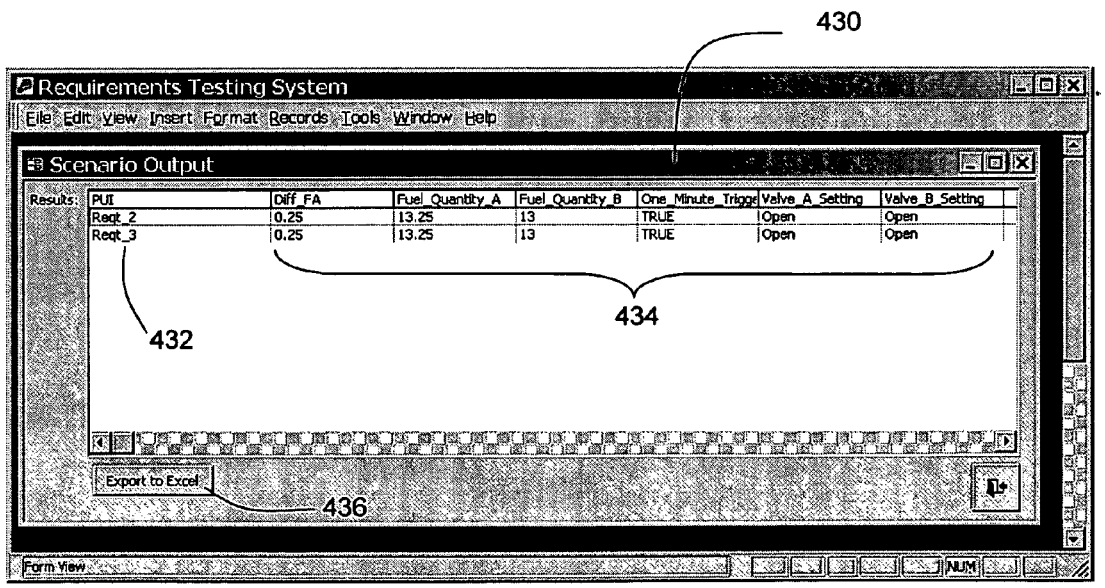
Figure 20C:
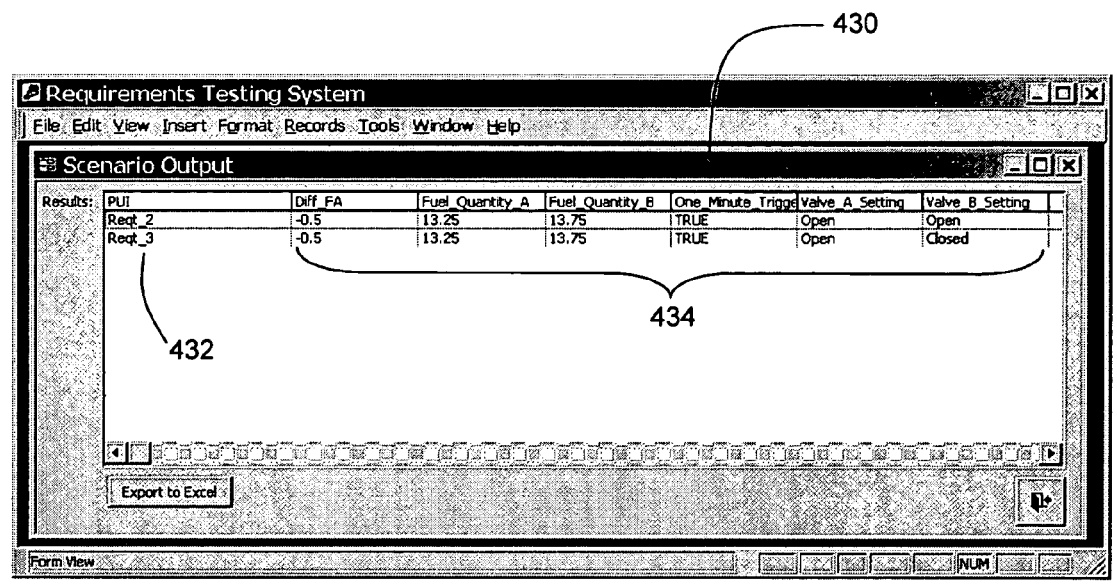

Reporting Evaluation Results:

After processing the SRL with the test scenario, the simulation results of the evaluation can be viewed using the "Show Results" aspect of the present invention (upon selection of the "Show Results" icon 424 of GUI 400 (see FIG. 19)). FIG. 20(*a*) shows a scenario output report 430 that is created upon evaluation of a requirement/group. Report 430 identifies each software requirement tested in column 432 as well as the values 434 exhibited by the variables at the conclusion of the test. In this example, it can be seen that, at the conclusion of testing software requirement 2 with the Fuel Tank Balance 1 scenario, the value for Diff_$F_A$ was 0.259999 . . . (which closely approximates the expected value of 0.26), the value for Fuel_Quantity_A was 13.26 (as expected), the value for Fuel_Quantity_B was 13.0 (as expected), the value for One_Minute_Trigger was True (as expected), and the values for Valve_Setting_A and Valve_Setting_B were both Open (as expected). Further, at the conclusion of testing software requirement 3 with the Fuel Tank Balance 1 scenario, the value for Diff_$F_A$ was 0.259999 . . . (which closely approximates the expected value of 0.26), the value for Fuel_Quantity_A was 13.26 (as expected), the value for Fuel_Quantity_B was 13.0 (as expected), the value for One_Minute_Trigger was True (as expected), the value for Valve_Setting_A was closed (which was not as expected), and the value for Valve_Setting_B was Open (also not as expected). Essentially, when the fuel quantity in Tank A exceeded the fuel quantity in Tank B by more than 0.25, the value of Valve_Setting_A became closed as defined by the table software requirement 3 (see FIG. 6). However, this result is not expected in order to achieve parity of fuel quantity between Tanks A and B, thus revealing an error in software requirement 3 that needs correction. Further, report 430 is preferably provided with an export icon 436 that, upon selection, exports the scenario output report to a spreadsheet program such as Microsoft Excel, which allows for generation of a report capable of manipulation in a format familiar to many users.

Further examples of simulation results can be seen in FIGS. 20(*b*) and (*c*). FIG. 20(*b*) shows an output report 430 for a test scenario wherein the fuel quantity in Tank A exceeds that of Tank B by only 0.25. Under such situations, it would be expected that the setting for Valve_A_Setting remain open (as per software requirement 3 shown in FIG. 6). Judging from scenario output report 430 in FIG. 20(*b*) that expected result was successfully achieved. FIG. 20(*c*) shows a simulation report 430 for a test scenario wherein the fuel quantity in Tank B exceeds that of Tank A by 0.5. Under such situations, it would be expected that the setting for Valve_A_Setting would transition from Open to Closed in order to achieve fuel quantity parity as mandated by software requirement 3. The scenario output report 430 in FIG. 20(*c*), shows that this expected result was not achieved, again indicating the error in the table for software requirement 3 (see FIG. 6).

Further, it may be preferable for the scenario output reports to also identify each test scenario's expected variable values to thereby aid the user in quickly assessing whether the logical expression of the requirement/group properly functioned.

As described herein, the present invention represents a valuable tool for evaluating a set of software requirements early in the software development life cycle. The information generated by the present invention, from a library of test scenarios to a set of reports detailing the results of requirements analysis, prove helpful in guiding the design of software through subsequent development phases.

While the present invention has been described above in relation to its preferred embodiment, various modifications may be made thereto that still fall within the invention's scope, as would be recognized by those of ordinary skill in the art.

For example, the present invention describes a manual requirements translation process wherein the user first enters the text of the software requirement and then enters the software requirement in a parsable logical format (such as SRL). However, it may be the case that a practitioner of the present invention wishes to avoid the textual description of the software requirement and only enter the requirement in its logical format. While such a technique misses out on the benefit of having and storing a version of the software requirement that is easily understood (it is in relatively plain English), efficiency can be enhanced through the elimination of a step. Further, by having the software requirement expressed in English, any clarity problems that may exist in the software requirement can be recognized and resolved as the user attempts to translate it to a logical format. As such, the translation process can drive improvements in the requirement's plain English representation. Also, the inventors herein envision that an automated process for translating software requirements from plain English to their logical formats may be used in the practice of the present invention as improvements in natural language parsers continue and as systems engineers adopt a more structured and consistent language convention in their specifications.

Further, the scenario output reports may be provided with "step" details that show path traversal and expected results when multiple requirements are tested and a given variable undergoes more than one change. Similarly, the scenario creation modes may be modified to allow a given variable to step through a range of values during execution of a given test scenario to further streamline the testing process.

Also, as mentioned previously, the software requirements can be expressed logically using more complex algorithmic operators, although that is not preferred.

Moreover, the user-friendliness of the requirement entry GUI 260 may be enhanced by using a parsing tool to process the textual software requirement within box 266 (see FIG. 13) and create a skeleton SRL in box 268 that is automatically populated with the requirement's variables and enumerated values. Such a skeleton SRL may be used by a practitioner of the invention as a helpful starting point in creating a final version of the requirement SRL.

Figure 21A:
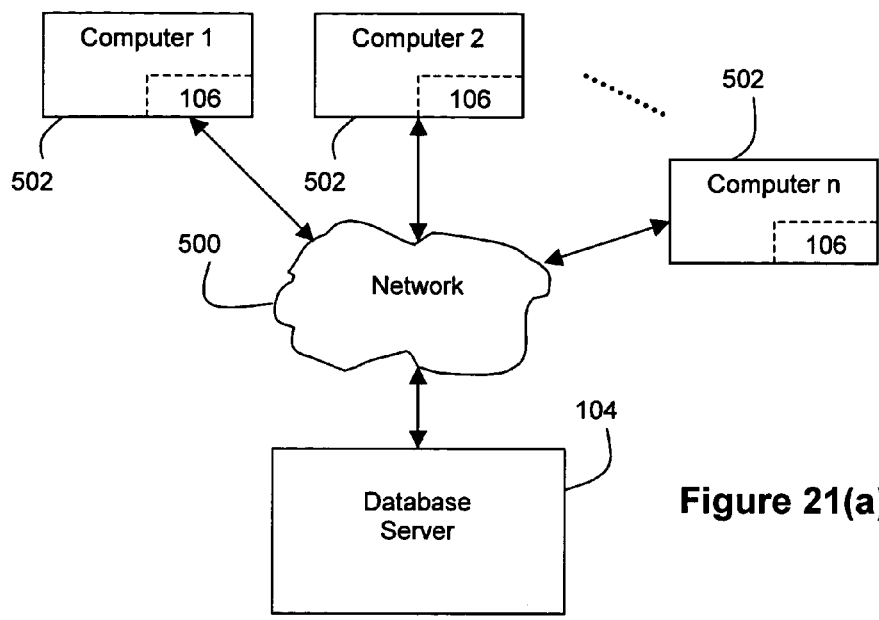
FIGS. 21(a) and (b) are illustrative alternative frameworks within which the present invention may be implemented.
Figure 21B:
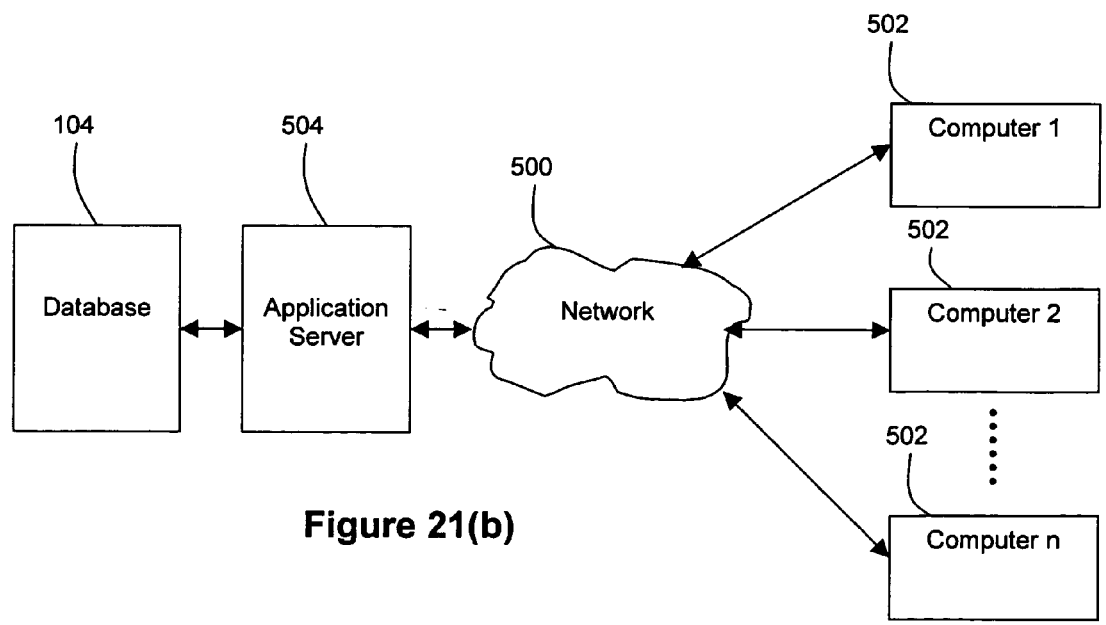

Further still, while it is preferred that the present invention be implemented on a conventional desktop PC or workstation, alternative implementation frameworks exist, as illustrated by FIGS. 21(*a*) and (*b*). FIG. 21(*a*) illustrates an embodiment wherein the database 104 is a server accessible by a plurality of computers 502 over a network 500. The network 500 may be any of a variety of networks, such as a local area network (LAN), the Internet, etc. The processor 106 that executes the programming embodying the present invention may be part of the computers 502. This embodiment allows users to easily share any software requirements, test scenarios, variables and the like among each other by virtue of the common network-accessible database. FIG. 21(*b*) illustrates an alternative embodiment wherein the computers 502 access an application server 504 over the network 500 to execute the tasks of the present invention. The programming of the present invention is accessible on the application server 504 for execution by the computers 502. Application server 504 also interacts with database 104 as needed. These examples represent but two possible frameworks for implementing the present invention.

These and other modifications to the invention will be recognizable upon review of the teachings herein. As such, the full scope of the present invention is to be defined solely by the appended claims and their legal equivalents.

What is claimed is:

1. A method of logic testing a software requirement for a software capability, the method comprising:
   defining a software requirement in plain language;
   translating the plain language of the software requirement into a logical format that is parsable into programming code, wherein the logical format is defined by a structured requirement language, the structured requirement language is definable by a Backus Naur Form;

defining a test scenario by specifying one or more variables that correspond to the software requirement; and processing the logical format with the defined test scenario to thereby generate a simulation result indicative of whether the software requirement functioned as expected.

2. The method of claim 1 wherein each of the method steps are performed prior to a code and unit test phase for the software capability.

3. The method of claim 1 wherein each of the method steps are performed prior to a detailed design phase for the software capability.

4. The method of claim 1 wherein each of the method steps are performed prior to a software preliminary design phase for the software capability.

5. The method of claim 1 wherein each of the method steps are performed during a software requirements analysis phase for the software capability.

6. The method of claim 1 wherein there are a plurality of software requirements, wherein the variable specifying comprises defining a plurality of variables pertinent to the software requirements, wherein the translating the plain language comprises translating the plain language for each software requirement, wherein the test scenario defining step comprises defining at least one test scenario for at least one of the defined software requirements.

7. The method of claim 6 further comprising providing a first graphical user interface (GUI) through which the user defines the variables.

8. The method of claim 7 further comprising providing a second GUI through which the logical format is displayed.

9. The method of claim 8 further comprising providing a third GUI through which the user defines the test scenarios.

10. The method of claim 9 further comprising:
providing a fourth GUI through which the user groups a plurality of logical representations of the logical format for related software requirements into a testable group;
defining a test scenario that corresponds to the testable group; and
processing the testable group with the test scenario defined therefor to thereby generate a simulation result indicative of whether the group of related software requirements needs alteration.

11. The method of claim 10 further comprising generating a report of the simulation result.

12. The method of claim 10 further comprising providing a fifth GUI through which the user selects a test scenario and a logical representation of the logical format or testable group for processing.

13. The method of claim 10 wherein the test scenario defining step comprises defining an initial value for each variable pertinent to the software requirement or testable group to be processed.

14. The method of claim 13 wherein the test scenario defining step further comprises defining an expected value in the simulation result for each variable pertinent to the software requirement or testable group to be processed.

15. The method of claim 1 wherein the plain language software requirement comprises a software requirement expressed as a shall statement with respect to a processing transformation for at least one input variable and at least one output variable.

16. The method of claim 1 wherein the translating further comprises manually translating the plain language of the software requirement to the logical format.

17. The method of claim 1 wherein the translating further comprises automatically translating the plain language of the software requirement to the logical format.

18. The method of claim 1 wherein the translating further comprises automatically translating the plain language software requirement to generate a starting version of the logical format and manually defining the logical format from the starting version.

19. The method of claim 1 wherein the processing step comprises parsing the logical format into a plurality of nodes based on a pre-defined grammar, against which the defined test scenario will be run to generate the simulation result.

20. A system for logic testing a plurality of software requirements for a software capability, the system comprising:
memory in which (1) a plurality of logical representations of the software requirements expressed in a logical format are stored, and (2) a plurality of test scenarios corresponding to the software requirements are stored; and
a processor configured to execute a program, the program configured to (1) obtain user input expressed in plain language and corresponding to a selection of a software requirement to be tested, (2) translate the plain language corresponding to the selection of the software requirement into a logical format that is parsable into programming code, wherein the logical format is defined by a structured requirement language, the structured requirement language is definable by a Backus Naur Form, (3) obtain user input corresponding to a selection of a stored test scenario and one or more variables for use in testing the selected software requirement, (4) simulate operation of the selected software requirement by testing the logical format of the selected software requirement with the selected test scenario, and (5) provide output to the user indicative of whether the software requirement simulation operated as expected.

21. The system of claim 20 wherein the memory is further configured to also store the software requirements in a plain language form, and wherein the program is further configured to (1) display a graphical user interface (GUI) in which at least one plain language software requirement is shown, (2) accept user input through the GUI that corresponds to the logical format for the shown plain language software requirement, and (3) store the logical format corresponding to the user input in the memory.

22. The system of claim 21 wherein the stored logical format comprise a plurality of variables associated with each other through logical operators, wherein the memory stores the plurality of variables, and wherein the program is further configured to accept user input corresponding to a definition of the variables to be stored in memory.

23. The system of claim 22 wherein the program is further configured to accept user input corresponding to a definition of the logical format to be stored in memory using the stored variables.

24. The system of claim 23 wherein the program is further configured to accept user input corresponding to a definition of the test scenarios to be stored in memory.

25. The system of claim 24 wherein the program is further configured to (1) accept user input corresponding to a plurality of related software requirements to be grouped together as a testable group, (2) accept user input corresponding to a selection of a testable group to be tested, (3) accept user input corresponding to a selection of a stored test scenario for use in testing the selected testable group, (4)

simulate operation of the selected testable group by testing the stored logical format of the related software requirements comprising the selected testable group with the test scenario selected therefor, and (5) provide output to the user indicative of whether the testable group operate as expected.

26. The system of claim 21 wherein the plain language software requirement comprises a software requirement expressed as a shall statement with respect to a processing transformation for at least one input variable and at least one output variable.

27. The system of claim 21 wherein the program is further configured to simulate operation of the selected software requirement by parsing the logical format into a plurality of nodes based on a pre-defined grammar, against which the selected test scenario will be run.

28. The system of claim 27 wherein the program is further configured to (1) accept user input corresponding to an edit of the shown plain language software requirement, and (2) store the edited plain language software requirement in the memory.

29. The system of claim 20 wherein the memory is further configured to also store the software requirements in a plain language form, and wherein the program is further configured to (1) display a graphical user interface (GUI) in which at least one plain language software requirement is shown, (2) automatically translate the shown plain language software requirement with a natural language parsing program to generate a corresponding logical format of the plain language software requirement, and (3) store the generated logical format in the memory.

30. The system of claim 20 wherein the memory is further configured to also store the software requirements m a plain language form, and wherein the program is further configured to (1) display a graphical user interface (GUI) in which at least one plain language software requirement is shown, (2) automatically translate the shown plain language software requirement with a natural language parsing program to generate a starting version of a logical format of the plain language software requirement, (3) accept user input through corresponding to a modification of the logical format starting version to thereby produce the logical format that corresponds to the shown plain language software requirement, and (4) store the produced logical format in the memory.

31. A computer-readable medium for logic testing of a plurality of software requirements for a software capability, the computer-readable medium comprising:
   a code segment for defining a plurality of logical representations of the software requirements in a logical format in response to user input, the logical format being defined by a structured requirement language, the structured requirement language being definable by a Backus Naur Form;
   a code segment for defining, according to user input, a plurality of test scenarios by specifying one or more variables that correspond to the software requirements;
   a code segment for parsing the logical format into a plurality of nodes based on a pre-defined grammar; and
   a code segment for processing the plurality of nodes with a defined test scenario corresponding thereto to thereby generate a simulation result indicative of whether the software requirement corresponding to the processed logical format functioned as expected.

32. The computer-readable medium of claim 31 further comprising a code segment for defining a plurality of variables pertinent to the software requirements, and wherein the code segment for defining the logical format comprises a code segment for defining the logical format according to user input using the defined variables.

33. The computer-readable medium of claim 32 further comprising:
   a code segment for presenting a first graphical user interface (GUI) configured to accept user input for defining the variables;
   a code segment for presenting a second GUI configured to accept user input for defining the logical format using the defined variables;
   a code segment for presenting a third GUI configured to accept user input for defining the test scenarios; and
   a code segment for presenting a fourth GUI configured to accept user input for (1) selecting a software requirement for processing, and (2) selecting a test scenario with which the selected software requirement is processed.

34. The computer-readable medium of claim 33 further comprising a code segment for presenting a report to the user that describes the simulation result.

35. The computer-readable medium of claim 33 further comprising:
   a code segment for presenting a fifth GUI configured to accept user input for grouping related software requirements into a testable group;
   a code segment for associating the logical representations of the testable group's software requirements together;
   a code segment for defining, according to user input, a test scenario for the testable group; and
   a code segment for processing the associated logical representations of a testable group with the test scenario defined therefor to thereby generate a simulation result indicative of whether any of the related software requirements of the testable group functioned as expected.

36. The computer-readable medium of claim 31 wherein each plain language software requirement comprises a software requirement expressed as a shall statement with respect to a processing transformation for at least one input variable and at least one output variable.

37. The computer-readable medium of claim 31 further comprising a code segment for accepting user input corresponding to an edit of the at least one displayed plain language software requirement.

38. The computer-readable medium of claim 31 further comprising a code segment for displaying at least one of the software requirements in plain language, and wherein the code segment for defining the logical format comprises a code segment for automatically translating the at least one displayed plain language software requirement with a natural language parsing program to generate a corresponding pseudo-code logical representation for the at least one displayed plain language software requirement.

39. The computer-readable medium of claim 31 further comprising a code segment for displaying at least one of the software requirements in plain language, and wherein the code segment for defining the logical format comprises (1) a code segment for automatically translating the at least one displayed plain language software requirement with a natural language parsing program to generate a starting version of a logical format for the displayed at least one plain language software requirement, and (2) a code segment for accepting user input corresponding to a modification of the starting version logical format translation to generate the logical format for the at least one displayed plain language software requirement.

* * * * *

UNITED STATES PATENT AND TRADEMARK OFFICE
CERTIFICATE OF CORRECTION

| | |
|---|---|
| PATENT NO. | : 7,228,524 B2 |
| APPLICATION NO. | : 10/326221 |
| DATED | : June 5, 2007 |
| INVENTOR(S) | : Bruce Lindley-Burr Bailey, Tomas Jan Stenstrom and William E. Coughenour, Jr. |

It is certified that error appears in the above-identified patent and that said Letters Patent is hereby corrected as shown below:

In the Specifications:

Column 1, Line 8: - "DAAH23-00-C-A001" should be -- DAAH23-00-C-0001 --

Signed and Sealed this
Eighteenth Day of June, 2013

Teresa Stanek Rea
*Acting Director of the United States Patent and Trademark Office*